United States Patent
Sasaki

(10) Patent No.: US 11,974,285 B2
(45) Date of Patent: Apr. 30, 2024

(54) BASE STATION, TERMINAL APPARATUS, METHOD, PROGRAM, AND RECORDING MEDIUM

(71) Applicant: NEC Corporation, Tokyo (JP)

(72) Inventor: Shizen Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 455 days.

(21) Appl. No.: 17/288,061

(22) PCT Filed: Oct. 23, 2019

(86) PCT No.: PCT/JP2019/041470
§ 371 (c)(1),
(2) Date: Apr. 23, 2021

(87) PCT Pub. No.: WO2020/090573
PCT Pub. Date: May 7, 2020

(65) Prior Publication Data
US 2021/0385810 A1    Dec. 9, 2021

(30) Foreign Application Priority Data
Oct. 31, 2018    (JP) .................................. 2018-205676

(51) Int. Cl.
*H04W 72/04* (2023.01)
*H04B 7/06* (2006.01)
(Continued)

(52) U.S. Cl.
CPC .......... *H04W 72/21* (2023.01); *H04B 7/0626* (2013.01); *H04L 5/0057* (2013.01)

(58) Field of Classification Search
CPC ..... H04W 72/21; H04W 72/23; H04W 72/54; H04W 24/10; H04B 7/0626; H04B 7/0639; H04L 5/0057
See application file for complete search history.

(56) References Cited

U.S. PATENT DOCUMENTS 10,274,773 B2 * 4/2019 Wu ....................... G02F 1/1334
2019/0141677 A1 * 5/2019 Harrison ............... H04L 5/0057
(Continued)

FOREIGN PATENT DOCUMENTS

| JP | 2016-105605 A | 6/2016 |
| JP | 2019-169838 A | 10/2019 |
| WO | 2018/173002 A1 | 9/2018 |

OTHER PUBLICATIONS

JP Office Action for JP Application No. 2020-553810, dated Jun. 7, 2022 with English Translation.
(Continued)

*Primary Examiner* — Vinncelas Louis
(74) *Attorney, Agent, or Firm* — Sughrue Mion, PLLC

(57) ABSTRACT

In order to enable appropriate signaling of information related to a configuration for reporting aperiodic channel state information using a Physical Uplink Control Channel (PUCCH) to a terminal apparatus, a base station 100 includes: an obtaining unit configured to obtain information related to a configuration of a first aperiodic trigger state for a terminal apparatus 200 to aperiodically report first channel state information by using a PUCCH; and a transmitting processing unit configured to transmit, to the terminal apparatus 200, a Radio Resource Control (RRC) message including the information related to the configuration of the first aperiodic trigger state.

12 Claims, 17 Drawing Sheets

(51) Int. Cl.
*H04L 5/00* (2006.01)
*H04W 72/21* (2023.01)

(56) References Cited

U.S. PATENT DOCUMENTS

2019/0296854 A1 9/2019 Kubo et al.
2020/0336186 A1* 10/2020 Chen .................. H04W 72/23

OTHER PUBLICATIONS

Huawei et al., "CSI enhancements for URLLC", 3GPP TSG RAN WG1 #94b, R1-1810720, pp. 1-5.
International Search Report for PCT Application No. PCT/JP2019/041470, dated Dec. 3, 2019.
3rd Generation Partnership Project, "Technical Specification Group Radio Access Network: NR; Physical layer procedures for data (Release 15)", 3GPP TS38.214 V15.2.0, Jun. 2018, pp. 1-95.
Huawei et al., "CSI feedback enhancements for URLLC", 3GPP TSG RAN WG1 Meeting #92bis, R1-1804289, Sanya, China, Apr. 16-20, 2018.
3rd Generation Partnership Project, "Technical Specification Group Radio Access Network; NR; Multiplexing and channel coding (Release 15)", 3GPP TS38.212 V15.2.0, Jun. 2018, pp. 1-98.
Ericsson, "Triggered A-CSI on PUCCH", 3GPP TSG RAN WG1 Meeting #94bis, R1-1810318, Chengdu, China. Oct. 8-12, 2018.
3rd Generation Partnership Project, "Technical Specification Group Radio Access Network; NR; Radio Resource Control (RRC) protocol specification (Release 15)", 3GPP TS38.331 V15.3.0, Sep. 2018, pp. 179-180.
3rd Generation Partnership Project, "Technical Specification Group Radio Access Network; NR; Physical layer procedures for data (Release 15)", 3GPP TS38.214 V15.3.0, Sep. 2018, pp. 34-42.
Extended European Search Report for EP Application No. 19878436.5 dated Nov. 23, 2021.
Huawei et al., "Summary of remaining issues for CSI reporting", 3GPP Draft, 3GPP TSG RAN WG1 Ad Hoc Meeting, R1-1800095, Jan. 13, 2018.
Ericsson, "Summary of views on CSI reporting v4", 3GPP Draft, 3GPP TSG-RAN WG1 Meeting #94bis, R1-1812015, Oct. 11, 2018.
Huawei et al., "CR for L1-RSRP measurement requirements (section 8.7)", 3GPP Draft, 3GPP TSG-WG4 Meeting #88bis, R4-1812997, Sep. 28, 2018.

* cited by examiner

```
                CSI-ReportConfig
  - reportConfigId
  ...
  - resourcesForChannelMeasurement
  ...
  - reportConfigType
  - reportQuantity
  ...
  - codebookConfig
       - codebookType
           - type1
               - codebookMode
  - groupBasedBeamReporting
       - disabled
           - nrofReportedRS
  ...
```

FIG.7

```
         CSI - ResourceConfig
- csi - ResourceConfigId
- csi - RS - ResourceSetList
   - nzp - CSI - RS - SSB
      - nzp - CSI - RS - ResourceSetList    (Max 16)
         - NZP - CSI - RS - ResourceSetId
      - csi - SSB - ResourceSetList     (Max 1)
         - CSI - SSB - ResourceSetId
  ...
- resourceType
```

FIG.8

NZP-CSI-RS-ResourceSet
- nzp-CSI-ResourceSetId
- nzp-CSI-RS-Resources   (Max 64)
    - NZP-CSI-RS-ResourceId
- repetition
...

FIG.9

```
    NZP-CSI-RS-Resource
-  nzp-CSI-RS-ResourceId
-  resourceMapping
...
-  periodicityAndOffset
...
```

FIG.10

BASE STATION, TERMINAL APPARATUS, METHOD, PROGRAM, AND RECORDING MEDIUM

This application is a National Stage Entry of PCT/JP2019/041470 filed on Oct. 23, 2019, which claims priority from Japanese Patent Application 2018-205676 filed on Oct. 31, 2018, the contents of all of which are incorporated herein by reference, in their entirety.

BACKGROUND

Technical Field

The present invention relates to a base station, a terminal apparatus, a method, a program, and a recording medium related to transmission and reception of data via a radio access network.

Background Art

In a radio communication system, as a system for a base station to obtain a channel state of the downlink, a Channel State Information (CSI) framework has been known. In the CSI framework, a terminal apparatus performs measurement for a reference signal (RS) transmitted by the base station, and generates channel state information (CSI) of the downlink. Next, the terminal apparatus transmits a CSI report configured based on the generated CSI to the base station by using the uplink.

As a method in which the base station dynamically indicates transmission of the CSI report for the terminal apparatus by using downlink control information (DCI), an aperiodic CSI report has been known. NR release 15, which is the first version of New Radio (NR) being a mobile communication system of the fifth generation, defines a scheme in which the terminal apparatus transmits an aperiodic CSI report on a physical uplink shared channel (PUSCH) (e.g., see NPL 1).

Further, in the study of the specification of NR release 16 with the aim of enhancement of functions of NR, a scheme in which the terminal apparatus transmits the aperiodic CSI report on a physical uplink control channel (PUCCH) has been proposed (e.g., see NPL 2). Specifically, in NPL 2, a scheme in which the CSI is reported with low latency by using the PUCCH has been proposed.

CITATION LIST

Non Patent Literature

[NPL 1] 3GPP, "3GPP TS 38. 214 v15.2.0," June 2018.
[NPL 2] Huawei, HiSilicon "CSI feedback enhancements for URLLC", 3GPP TSG RAN WG1 Meeting #92bis. Sanya, China, 16-20 Apr. 2018. R1-1804289

SUMMARY

Technical Problem

However, in NPL 2, there is no description on specific contents about definition of the CSI and configuration of a bit field or the like. In this manner, in NPL 2 described above or the like, when a report of the aperiodic channel state information (CSI) is performed by using the PUCCH, specific study has not yet been carried out on signaling of information related to the configuration for reporting the aperiodic channel state information to the terminal apparatus.

The example object of the present invention is to provide a base station and a terminal apparatus that enable appropriate signaling of information related to a configuration for reporting aperiodic channel state information using a PUCCH to a terminal apparatus.

Solution to Problem

According to one example aspect of the present invention, a base station includes: an obtaining unit configured to obtain information related to a configuration of a first aperiodic trigger state for a terminal apparatus to aperiodically report first channel state information by using a Physical Uplink Control Channel (PUCCH); and a transmitting processing unit configured to transmit, to the terminal apparatus, a Radio Resource Control (RRC) message including the information related to the configuration of the first aperiodic trigger state.

According to one example aspect of the present invention, a terminal apparatus includes: a receiving processing unit configured to receive, from a base station, a Radio Resource Control (RRC) message including information related to a configuration of a first aperiodic trigger state to aperiodically report first channel state information by using a Physical Uplink Control Channel (PUCCH); and a transmitting processing unit configured to transmit, to the base station, the first channel state information using the PUCCH based on the information related to the configuration of the first aperiodic trigger state.

According to one example aspect of the present invention, a first method includes: obtaining information related to a configuration of a first aperiodic trigger state for a terminal apparatus to aperiodically report first channel state information by using a Physical Uplink Control Channel (PUCCH); and transmitting, to the terminal apparatus, a Radio Resource Control (RRC) message including the information related to the configuration of the first aperiodic trigger state.

According to one example aspect of the present invention, a second method includes: receiving, from a base station, a Radio Resource Control (RRC) message including information related to a configuration of a first aperiodic trigger state to aperiodically report first channel state information by using a Physical Uplink Control Channel (PUCCH); and transmitting, to the base station, the first channel state information by using the PUCCH, based on the information related to the configuration of the first aperiodic trigger state.

According to one example aspect of the present invention, a first program causes a processor to execute: obtaining information related to a configuration of a first aperiodic trigger state for a terminal apparatus to aperiodically report first channel state information by using a Physical Uplink Control Channel (PUCCH); and transmitting, to the terminal apparatus, a Radio Resource Control (RRC) message including the information related to the configuration of the first aperiodic trigger state.

According to one example aspect of the present invention, a second program causes a processor to execute: receiving, from a base station, a Radio Resource Control (RRC) message including information related to a configuration of a first aperiodic trigger state to aperiodically report first channel state information by using a Physical Uplink Control Channel (PUCCH); and transmitting, to the base station, the first channel state information by using the PUCCH, based on the information related to the configuration of the first aperiodic trigger state.

According to one example aspect of the present invention, a first recording medium is a non-transitory computer readable recording medium storing a program that causes a processor to execute: obtaining information related to a configuration of a first aperiodic trigger state for a terminal apparatus to aperiodically report first channel state information by using a Physical Uplink Control Channel (PUCCH); and transmitting, to the terminal apparatus, a Radio Resource Control (RRC) message including the information related to the configuration of the first aperiodic trigger state.

According to one example aspect of the present invention, the second recording medium is a non-transitory computer readable recording medium storing a program that causes a processor to execute: receiving, from a base station, a Radio Resource Control (RRC) message including information related to a configuration of a first aperiodic trigger state to aperiodically report first channel state information by using a Physical Uplink Control Channel (PUCCH); and transmitting, to the base station, the first channel state information by using the PUCCH, based on the information related to the configuration of the first aperiodic trigger state.

Advantageous Effects of Invention

According to the present invention, the information related to the configuration for reporting the aperiodic channel state information using the PUCCH can be appropriately signaled to the terminal apparatus. Note that, according to the present invention, instead of or together with the above effects, other effects may be exerted.

BRIEF DESCRIPTION OF THE DRAWINGS

FIG. 7 is a diagram illustrating specific parameters included in a CSI-ReportConfig IE;
FIG. 8 is a diagram illustrating specific parameters included in a CSI-ResourceConfig IE;
FIG. 9 is a diagram illustrating specific parameters included in an NZP-CSI-RS-ResourceSet IE;
FIG. 10 is a diagram illustrating specific parameters included in an NZP-CSI-RS-Resource IE.

DESCRIPTION OF THE EXAMPLE EMBODIMENTS

Figure 1:
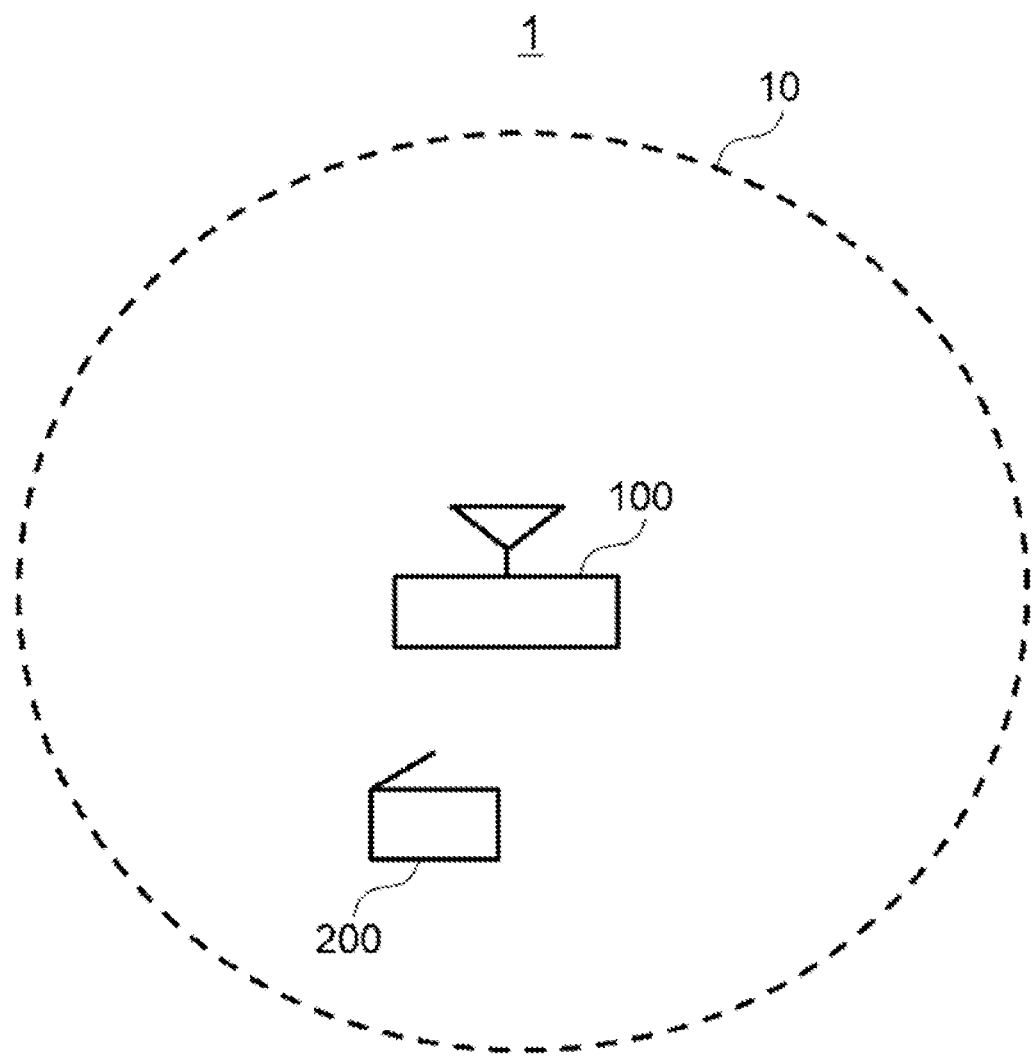
FIG. 1 is an explanatory diagram illustrating an example of a schematic configuration of a system 1 according to example embodiments of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments
2. Configuration of System
3. First Example Embodiment
3.1. Configuration of Base Station
3.2. Configuration of Terminal Apparatus
3.3. Technical Features
4. Second Example Embodiment
4.1. Configuration of Base Station
4.2. Configuration of Terminal Apparatus
4.3. Technical Features
5. Other Embodiments 1. Overview of Example Embodiments First, an overview of example embodiments of the present invention will be described.

(1) Technical Problem

In a radio communication system, as a system for a base station to obtain a channel state of the downlink, a Channel State Information (CSI) framework has been known. In the CSI framework, a terminal apparatus performs measurement for a reference signal (RS) transmitted by the base station, and generates channel state information (CSI) of the downlink. Next, the terminal apparatus transmits a CSI report including the generated CSI to the base station by using the uplink.

As a method in which the base station dynamically indicates transmission of the CSI report for the terminal apparatus by using downlink control information (DCI), an aperiodic CSI report has been known. NR release 15, which is the first version of New Radio (NR) being a mobile communication system of the fifth generation, defines a scheme in which the terminal apparatus transmits an aperiodic CSI report on a physical uplink shared channel (PUSCH) (e.g., see Literature 1 described below). In addition, NR release 15 defines a scheme in which transmit indication information for the aperiodic CSI report is included in DCI (hereinafter also referred to as "UL DCI") for performing scheduling of the PUSCH (e.g., see Literature 2 described below). Note that the DCI is transmitted on a physical downlink control channel (PDCCH).

Literature 1: 3GPP, "3GPP TS 38. 214 v15.2.0," June 2018.

Literature 2: 3GPP, "3GPP TS 38. 212 v15.2.0," June 2018.

In the study of the specification of NR release 16 with the aim of enhancement of functions of NR, a scheme in which the terminal apparatus transmits the aperiodic CSI report on a physical uplink control channel (PUCCH) has been proposed (e.g., see Literature 3 described below). Specifically, in Literature 3 described below, a scheme in which the CSI is reported with low latency by using the PUCCH has been proposed.

Literature 3: Huawei, HiSilicon "CSI feedback enhancements for URLLC", 3GPP TSG RAN WG1 Meeting #92bis. Sanya, China, 16-20 Apr. 2018. R1-1804289

When the aperiodic CSI report is performed by using the PUCCH as described above, the transmit indication information of the aperiodic CSI report is included in DCI (hereinafter also referred to as "DL DCI") for performing scheduling of a physical downlink shared channel (PDSCH). Further, the aperiodic CSI report is multiplexed on a Hybrid Automatic Repeat reQuest-ACKnowledgement (HARQ-ACK) indicating reception results of the PDSCH, and the aperiodic CSI report and the HARQ-ACK are transmitted on the same PUCCH resource as one piece of uplink control information (UCI).

In this manner, by including the transmit indication information of the aperiodic CSI report in the DL DCI, for example, transmission indication of the aperiodic CSI report can be performed at the time of retransmission of the PDSCH. In other words, prompt link adaptation can be performed. Moreover, the CSI report and the HARQ-ACK are multiplexed and are transmitted on one PUCCH resource, and thus uplink resources can be efficiently used.

However, in Literature 3 described above, there is no description on specific contents about definition of the CSI and configuration of a bit field or the like. In this manner, in Literature 3 described above or the like, when a report of the aperiodic channel state information (CSI) is performed by using the PUCCH, specific study has not yet been carried out on signaling of information related to the configuration for reporting the aperiodic channel state information to the terminal apparatus.

As described above, when the terminal apparatus multiplexes the HARQ-ACK and the CSI report and transmits one piece of UCI, the coding rate of the UCI is increased as compared to the case in which the HARQ-ACK is transmitted individually. In this manner, when the base station fails in decoding of the UCI, the base station cannot correctly recognize the HARQ-ACK transmitted by the terminal apparatus. In this manner, retransmission of the PDSCH may be caused. As a result, downlink and uplink radio resources may be consumed in vain.

In order to solve the problem described above, the example object of the present example embodiments is to enable appropriate signaling of information related to a configuration for reporting aperiodic channel state information using the PUCCH to the terminal apparatus.

(2) Technical Features

In the present example embodiment, for example, a base station obtains information related to a configuration of a first aperiodic trigger state for a terminal apparatus to aperiodically report first channel state information by using a Physical Uplink Control Channel (PUCCH), and transmits, to the terminal apparatus, a Radio Resource Control (RRC) message including the information related to the configuration of the first aperiodic trigger state.

The terminal apparatus receives the RRC message including the information related to the configuration of the first aperiodic trigger state from the base station, and transmits, to the base station, the first channel state information by using the PUCCH, based on the information related to the configuration of the first aperiodic trigger state.

In this manner, for example, the information related to the configuration for reporting the aperiodic channel state information using the PUCCH can be appropriately signaled to the terminal apparatus. Note that the above-described technical features are concrete examples of the example embodiments of the present invention, and the present example embodiments of the present invention are, of course, not limited to the above-described technical features.

2. Configuration of System

With reference to FIG. 1, an example of a configuration of a system 1 according to the example embodiments of the present invention will be described. FIG. 1 is an explanatory diagram illustrating an example of a schematic configuration of the system 1 according to the example embodiments of the present invention. With reference to FIG. 1, the system 1 includes a base station 100 and a terminal apparatus 200.

The system 1 is, for example, a system conforming to Third Generation Partnership Project (3GPP) standards/specifications. More specifically, for example, the system 1 may be a system that conforms to standards/specifications of LTE/LTE-Advanced/LTE-Advanced Pro and/or System Architecture Evolution (SAE). Alternatively, the system 1 may be a system that conforms to fifth generation (5G)/NR standards/specifications. The system 1 is, of course, not limited to these examples.

(1) Base Station 100

The base station 100 is a node of a radio access network (RAN), and performs radio communication with the terminal apparatus (e.g., the terminal apparatus 200) that is located in a coverage area 10.

For example, the base station 100 may be an evolved Node B (eNB), or may be a generation Node B (gNB) in 5G. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) Terminal Apparatus 200

The terminal apparatus 200 performs radio communication with the base station. For example, the terminal apparatus 200 performs radio communication with the base station 100 in a case of being located in the coverage area 10 of the base station 100. For example, the terminal apparatus 200 is a user equipment (UE).

3. First Example Embodiment

Next, a description will be given of a first example embodiment of the present invention with reference to FIGS. 2 to 15.

<3.1. Configuration of Base Station>

Figure 2:
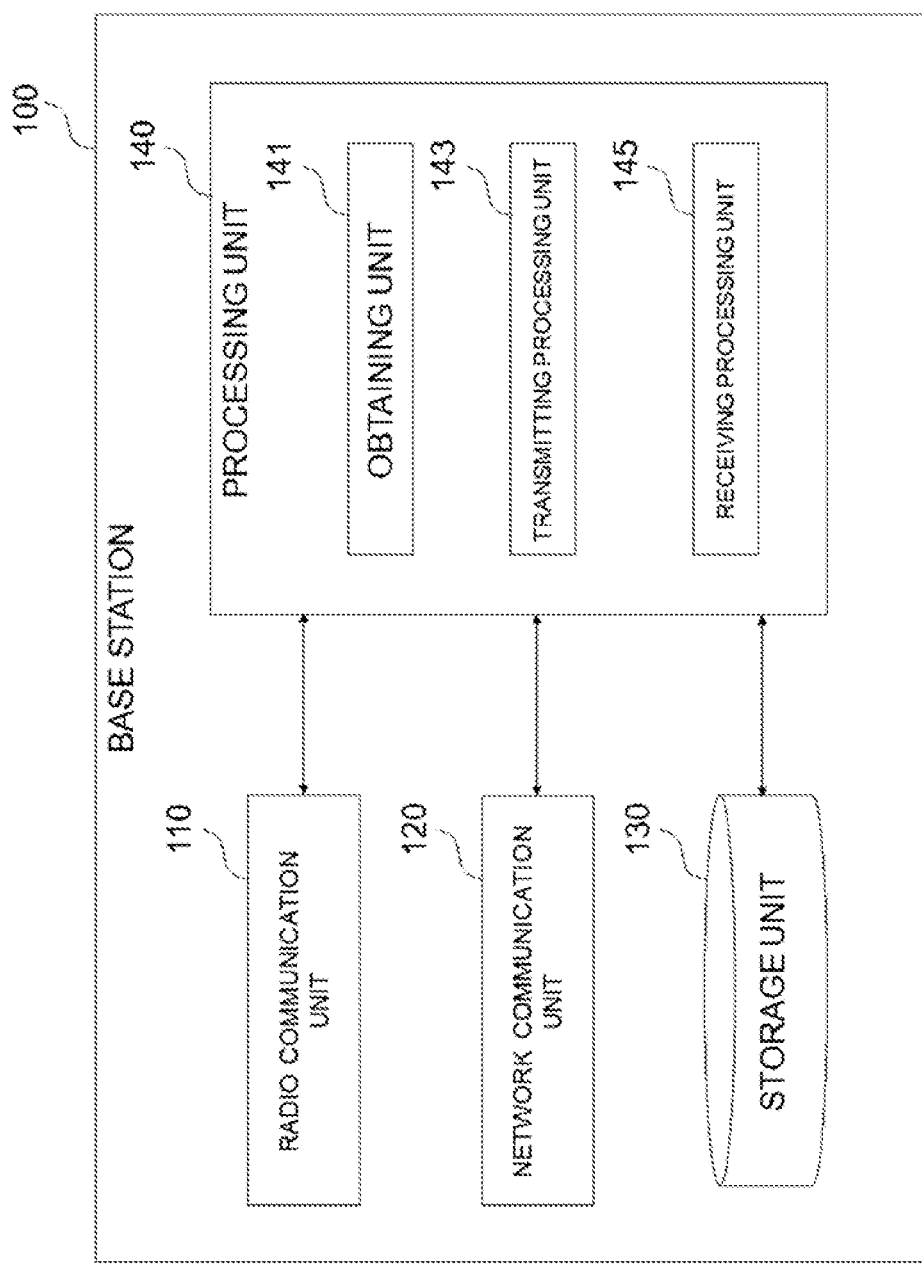
FIG. 2 is a block diagram illustrating an example of a schematic configuration of a base station 100 according to a first example embodiment.

Next, with reference to FIG. 2, an example of a configuration of the base station 100 according to the first example embodiment will be described. The figure is a block diagram illustrating an example of a schematic configuration of the base station 100 according to the first example embodiment. With reference to FIG. 2, the base station 100 includes a radio communication unit 110, a network communication unit 120, a storage unit 130, and a processing unit 140.

(1) Radio Communication Unit 110

The radio communication unit 110 wirelessly transmits and/or receives a signal. For example, the radio communication unit 110 receives a signal from the terminal apparatus, and transmits a signal to the terminal apparatus.

(2) Network Communication Unit 120

The network communication unit 120 receives a signal from a network and transmits a signal to the network.

(3) Storage Unit 130

The storage unit 130 temporarily or permanently stores programs (instructions) and parameters for operations of the base station 100 as well as various data. The program includes one or more instructions for operations of the base station 100.

(4) Processing Unit 140

The processing unit 140 provides various functions of the base station 100. The processing unit 140 includes an obtaining unit 141, a transmitting processing unit 143, and a receiving processing unit 145. Note that the processing unit 140 may further include constituent elements other than these constituent elements. In other words, the processing unit 140 may also perform operations other than the operations of these constituent elements. Specific operations of the obtaining unit 141, the transmitting processing unit 143, and the receiving processing unit 145 will be described later in detail.

For example, the processing unit 140 (the transmitting processing unit 143 and the receiving processing unit 145) communicates with the terminal apparatus (e.g., the terminal apparatus 200) via the radio communication unit 110. For example, the processing unit 140 (the transmitting processing unit 143 and the receiving processing unit 145) communicates with another network node (e.g., a node of a core network) via the network communication unit 120.

(5) Implementation Example

The radio communication unit 110 may be implemented with an antenna, a radio frequency (RF) circuit, and the like, and the antenna may be a directional antenna. The network communication unit 120 may be implemented with a network adapter and/or a network interface card, and the like. The storage unit 130 may be implemented with a memory (e.g., a nonvolatile memory and/or a volatile memory) and/or a hard disk, and the like. The processing unit 140 may be implemented with one or more processors, such as a baseband (BB) processor and/or a different kind of processor. The obtaining unit 141, the transmitting processing unit 143, and the receiving processing unit 145 may be implemented with the same processor, or may be implemented with separate processors. The memory (storage unit 130) may be included in the one or more processors, or may be provided outside the one or more processors.

The base station 100 may include a memory configured to store a program (instructions) and one or more processors that can execute the program (instructions). The one or more processors may execute the program and thereby perform operations of the processing unit 140 (operations of the obtaining unit 141, the transmitting processing unit 143, and/or the receiving processing unit 145). The program may be a program for causing the processor(s) to perform operations of the processing unit 140 (the operations of the obtaining unit 141, the transmitting processing unit 143, and/or the receiving processing unit 145).

Note that the base station 100 may be virtual. In other words, the base station 100 may be implemented as a virtual machine. In this case, the base station 100 (the virtual machine) may operate as a physical machine (hardware) including a processor, a memory, and the like, and a virtual machine on a hypervisor.

<3.2. Configuration of Terminal Apparatus>

Figure 3:
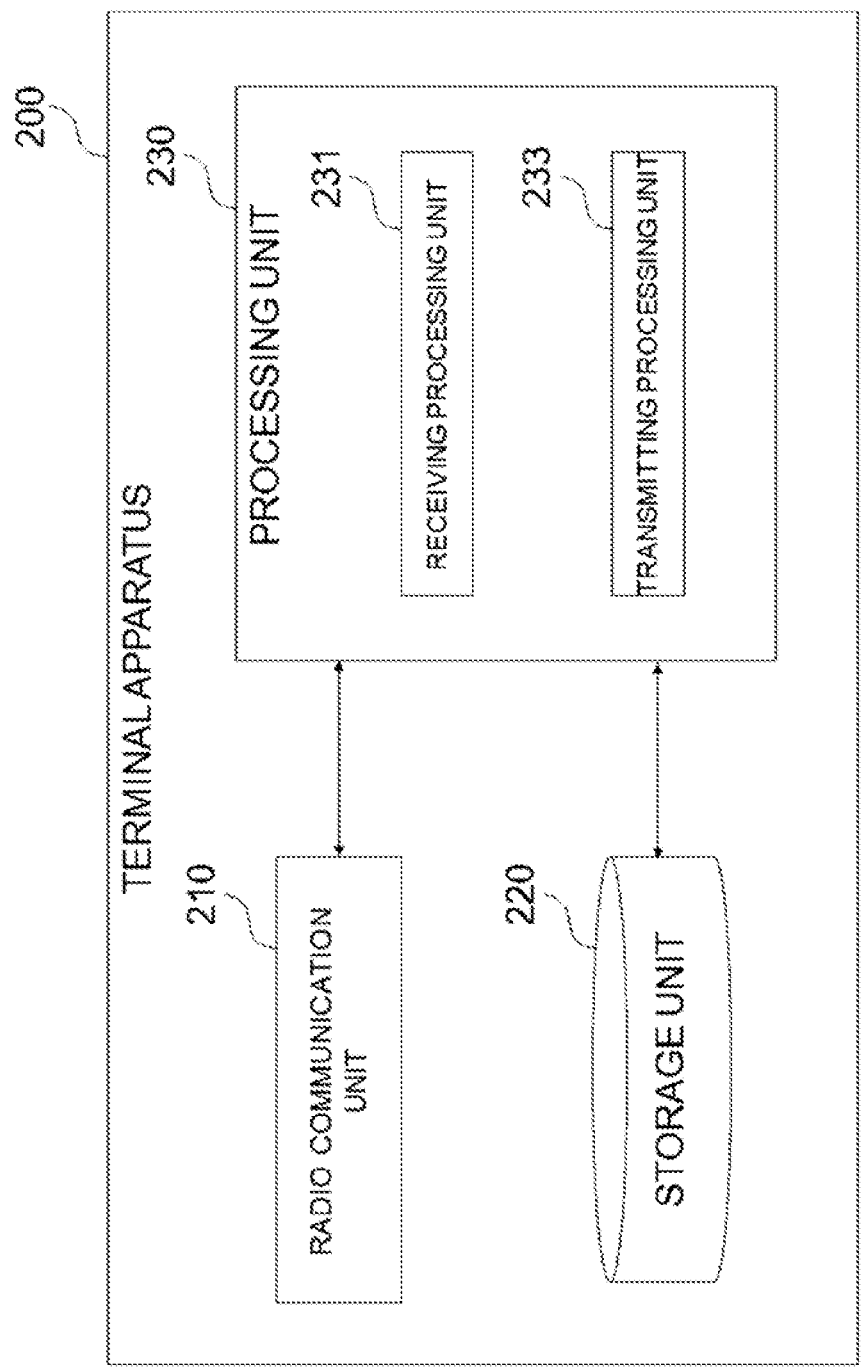
FIG. 3 is a block diagram illustrating an example of a schematic configuration of a terminal apparatus 200 according to the first example embodiment.

Next, with reference to FIG. 3, an example of a configuration of the terminal apparatus 200 according to the first example embodiment will be described. FIG. 3 is a block diagram illustrating an example of a schematic configuration of the terminal apparatus 200 according to the first example embodiment. With reference to FIG. 3, the terminal apparatus 200 includes a radio communication unit 210, a storage unit 220, and a processing unit 230.

(1) Radio Communication Unit 210

The radio communication unit 210 wirelessly transmits and receives a signal. For example, the radio communication unit 210 receives a signal from the base station, and transmits a signal to the base station.

(2) Storage Unit 220

The storage unit 220 temporarily or permanently stores programs (instructions) and parameters for operations of the terminal apparatus 200 as well as various data. The program includes one or more instructions for the operations of the terminal apparatus 200.

(3) Processing Unit 230

The processing unit 230 provides various functions of the terminal apparatus 200. The processing unit 230 includes a receiving processing unit 231 and a transmitting processing unit 233. Note that the processing unit 230 may further include constituent elements other than these constituent elements. In other words, the processing unit 230 may also perform operations other than the operations of these constituent elements. Specific operations of the receiving processing unit 231 and the transmitting processing unit 233 will be described later in detail.

For example, the processing unit 230 (the receiving processing unit 231 and the transmitting processing unit 233) communicates with the base station (e.g., the base station 100) via the radio communication unit 210.

(4) Implementation Example

The radio communication unit 210 may be implemented with an antenna, a radio frequency (RF) circuit, and the like. The storage unit 220 may be implemented with a memory (e.g., a nonvolatile memory and/or a volatile memory) and/or a hard disk, and the like. The processing unit 230 may be implemented with one or more processors, such as a baseband (BB) processor and/or a different kind of processor. The receiving processing unit 231 and the transmitting processing unit 233 may be implemented with the same processor, or may be implemented with separate processors. The memory (storage unit 220) may be included in the one or more processors or may be provided outside the one or more processors. As an example, the processing unit 230 may be implemented in a System on Chip (SoC).

The terminal apparatus 200 may include a memory configured to store a program (instructions) and one or more processors that can execute the program (instructions). The one or more processors may execute the program and thereby perform operations of the processing unit 230 (operations of the receiving processing unit 231 and/or the transmitting processing unit 233). The program may be a program for causing the processor(s) to perform operations of the processing unit 230 (the operations of the receiving processing unit 231 and/or the transmitting processing unit 233).

<3.3. Technical Features>

Next, technical features according to the first example embodiment will be described.

Base Station

The base station 100 (obtaining unit 141) obtains information related to a configuration of a first aperiodic trigger state for the terminal apparatus 200 to aperiodically report the first channel state information by using the Physical Uplink Control Channel (PUCCH). Then, the base station 100 (transmitting processing unit 143) transmits a Radio Resource Control (RRC) message including the information related to the configuration of the first aperiodic trigger state to the terminal apparatus 200.

Terminal Apparatus

The terminal apparatus 200 (receiving processing unit 231) receives the Radio Resource Control (RRC) message including the information related to the configuration of the first aperiodic trigger state from the base station 100. Then, the terminal apparatus 200 (transmitting processing unit 233) transmits the first channel state information to the base station 100 by using the PUCCH, based on the information related to the configuration of the first aperiodic trigger state.

As in the manner described above, the Radio Resource Control (RRC) message including the information related to the configuration of the first aperiodic trigger state is transmitted from the base station 100 to the terminal apparatus 200. In this manner, the information related to the configuration for reporting the aperiodic channel state information using the PUCCH can be appropriately signaled from the base station 100 to the terminal apparatus 200.

(1) Information Related to Configuration of Aperiodic Trigger State

The aperiodic trigger state may be a configuration for dynamically selecting one or more configurations related to the aperiodic CSI report. The aperiodic trigger state may be dynamically selected out of parameters included in a CSI-AperiodicTriggerStateList IE that is notified by using the RRC message.

The aperiodic trigger state may be a configuration for triggering an aperiodic CSI-RS resource set for measurement of at least one of a channel and an interference. The aperiodic CSI-RS resource set may be indicated by parameters included in the CSI-AperiodicTriggerStateList IE that is notified by using the RRC message. One aperiodic trigger state may be started by using a CSI request field included in the DCI.

The terminal apparatus 200 may configure Resource Setting by using a CSI-ResourceConfig IE. For a resourceType parameter included in the CSI-ResourceConfig IE, any one of "aperiodic", "periodic", and "semi-persistent" may be configured. The CSI-RS resource set may be associated with the Resource Setting.

The terminal apparatus 200 may configure Reporting Setting by using a CSI-ReportConfig IE. For a reportConfigType parameter included in the CSI-ReportConfig IE, "aperiodic" may be configured.

One or more aperiodic trigger states for Reporting Setting may be configured by using the CSI-AperiodicTriggerStateList IE. In place or in addition to this, Resource Setting for measurement of at least any one of a channel and an interference in one or more component carriers may be configured by using the CSI-AperiodicTriggerStateList IE. The aperiodic trigger state may be associated with a candidate of any downlink Bandwidth Part. For the terminal apparatus 200, the aperiodic CSI report for an inactive downlink Bandwidth Part may not be triggered.

For example, when the information related to the configuration of the aperiodic trigger state is notified to the terminal apparatus 200 as a higher layer parameter, the terminal apparatus 200 configures a list of the aperiodic trigger states. Here, each of the aperiodic trigger states includes information for identifying information related to a configuration of channel state information and information for identifying a reference signal to be a measurement target when the channel state information is generated. Subsequently, the base station 100 transmits, to the terminal apparatus 200, bits related to the specific aperiodic trigger state of the list in the CSI request field included in the DCI. In this manner, the aperiodic CSI report corresponding to the specific aperiodic trigger state is indicated (triggered). Then, after receiving the DCI, the terminal apparatus 200 transmits the CSI report aperiodically (in other words, only once), based on the indication of the CSI report.

Information Related to Configuration of First Aperiodic Trigger State

Figure 4:
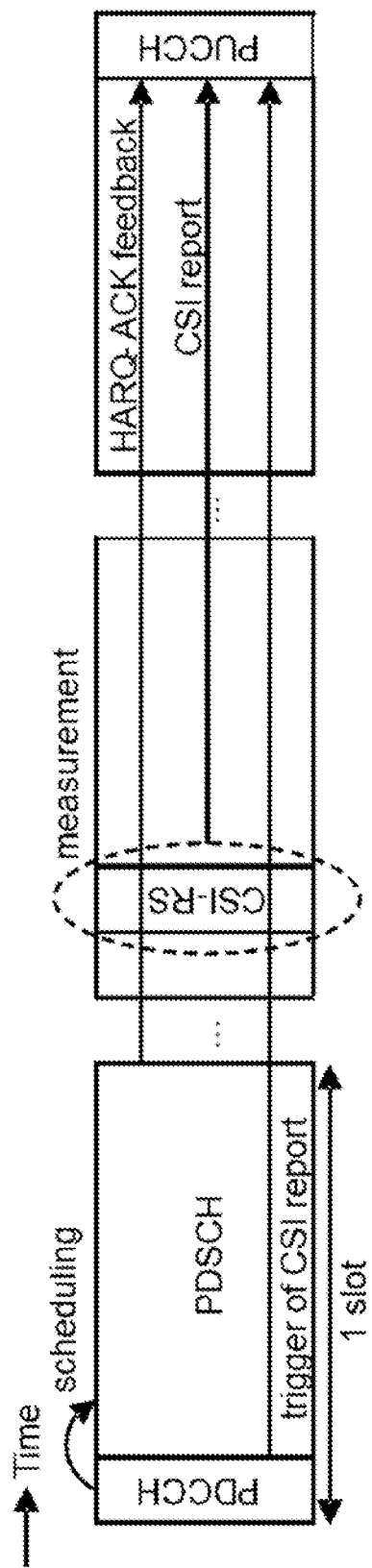
FIG. 4 is a schematic diagram for illustrating transmission indication of a CSI report when information related to a configuration of a first aperiodic trigger state is configured as a higher layer parameter.

FIG. 4 is a schematic diagram for illustrating transmission indication of the CSI report when the information related to the configuration of the first aperiodic trigger state is configured as a higher layer parameter.

As illustrated in FIG. 4, when the information related to the configuration of the first aperiodic trigger state is notified to the terminal apparatus 200 as a higher layer parameter, the terminal apparatus 200 configures a list of the first aperiodic trigger states. Subsequently, the base station 100 transmits, to the terminal apparatus 200, bits related to the first aperiodic trigger state in the CSI request field included in the DL DCI. In this manner, performance of the aperiodic CSI report corresponding to the first aperiodic trigger state is indicated (triggered) for the terminal apparatus 200. Then, after receiving the DL DCI, the terminal apparatus 200 transmits the CSI report aperiodically (in other words, only once) by using the PUCCH, based on the indication of the CSI report.

Information Related to Second Aperiodic Trigger State

The base station 100 (obtaining unit 141) may further obtain information related to a configuration of a second aperiodic trigger state for the terminal apparatus 200 to aperiodically report second channel state information by using the Physical Uplink Shared Channel (PUSCH). In this case, the base station 100 (transmitting processing unit 143) transmits, to the terminal apparatus 200, an RRC message including the information related to the configuration of the first aperiodic trigger state and the information related to the configuration of the second aperiodic trigger state.

Figure 5:
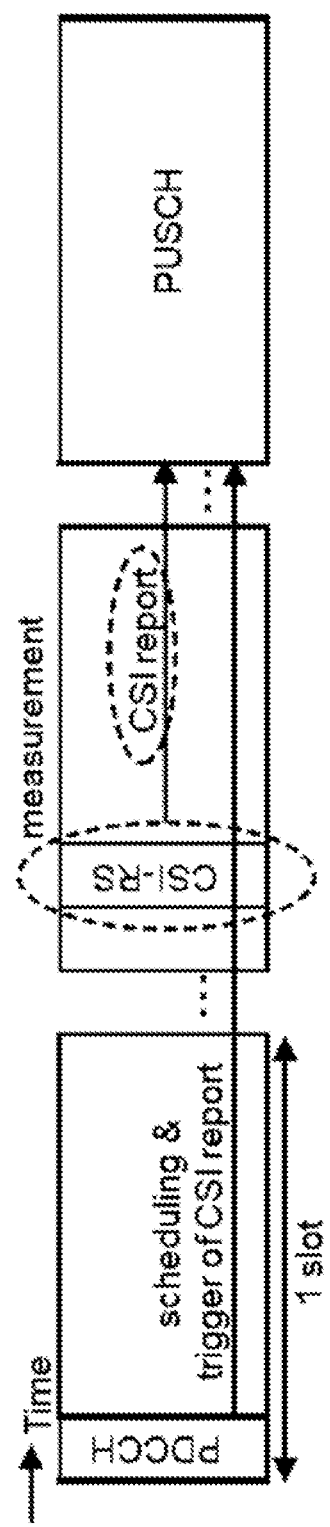
FIG. 5 is a schematic diagram for illustrating transmission indication of a CSI report when information related to a configuration of a second aperiodic trigger state is configured as a higher layer parameter.

FIG. 5 is a schematic diagram for illustrating transmission indication of the CSI report when the information related to the configuration of the second aperiodic trigger state is configured as a higher layer parameter.

As illustrated in FIG. 5, when the information related to the configuration of the second aperiodic trigger state is notified to the terminal apparatus 200 as a higher layer parameter, the terminal apparatus 200 configures a list of the second aperiodic trigger states. Subsequently, the base station 100 transmits, to the terminal apparatus 200, bits related to the second aperiodic trigger state in the CSI request field included in the UL DCI. In this manner, performing the aperiodic CSI report corresponding to the second aperiodic trigger state is indicated (triggered) for the terminal apparatus 200. Then, after receiving the UL DCI, the terminal apparatus 200 transmits the CSI report aperiodically (in other words, only once) by using the PUSCH, based on the indication of the CSI report.

(2) Identification Related to Aperiodic Trigger State

The information related to the configuration of the first aperiodic trigger state includes first identification information for identifying the first aperiodic trigger state from a plurality of candidate aperiodic trigger states.

As a first specific example, when the base station 100 (obtaining unit 141) obtains information related to a plurality of second aperiodic trigger states, the first identification information may be information for identifying a second aperiodic trigger state corresponding to the first aperiodic trigger state out of the plurality of second aperiodic trigger states.

The RRC message includes information related to a configuration of the first channel state information and information related to a configuration of the second channel state information.

As an example, in the first specific example, when the second aperiodic trigger state corresponding to the first aperiodic trigger state can be identified out of the plurality of second aperiodic trigger states, the information related to the configuration of the first channel state information associated with the first aperiodic trigger state is identified as follows, for example.

Specifically, the information related to the configuration of the second aperiodic trigger state includes second identification information for identifying the information related to the configuration of the second channel state information associated with the second aperiodic trigger state. Then, the information related to the configuration of the first channel state information associated with the first aperiodic trigger state is identified by the second identification information included in the information related to the configuration of the second aperiodic trigger state associated with the first aperiodic trigger state.

Figure 6:
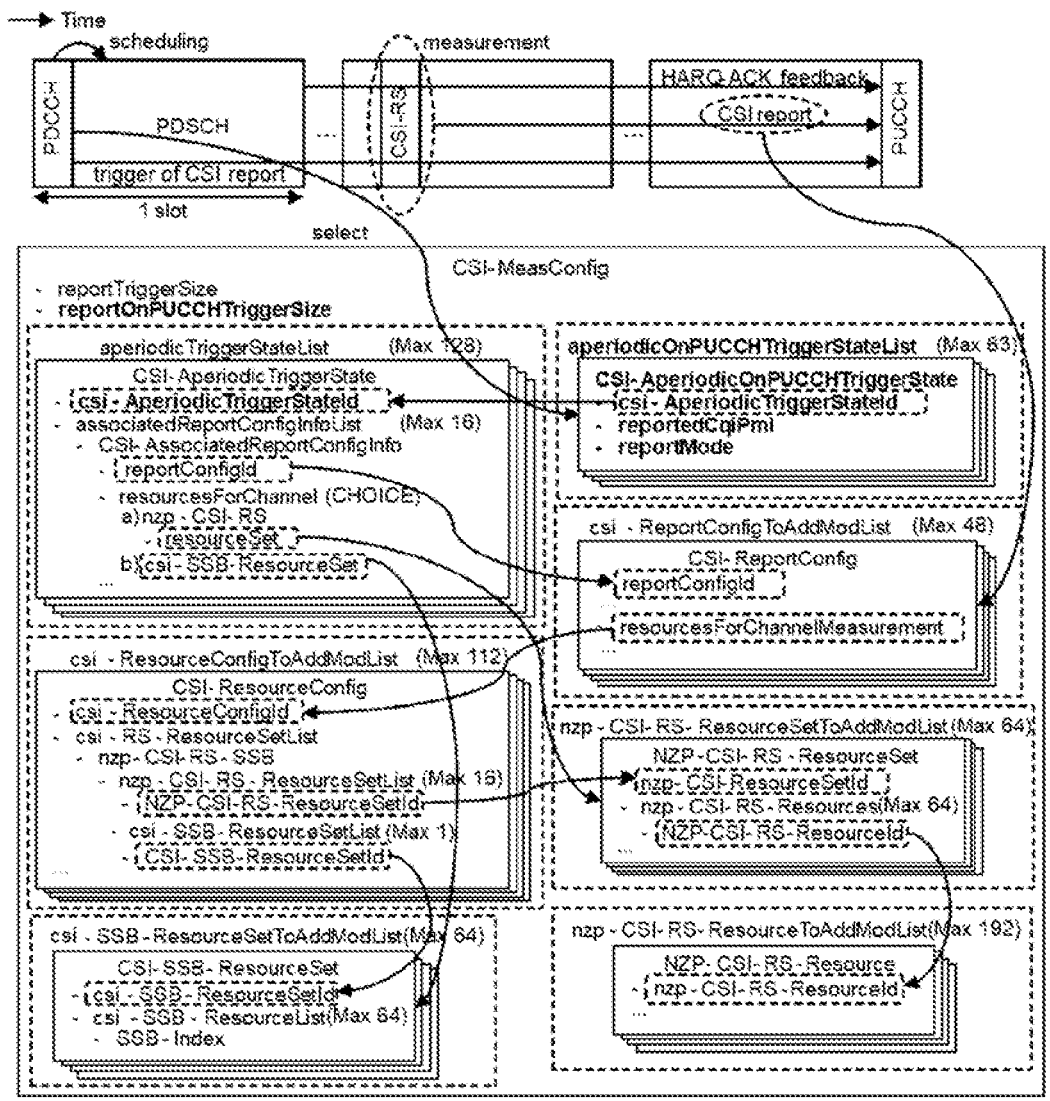
FIG. 6 is a diagram schematically illustrating a higher parameter CSI-MeasConfig IE of a CSI framework according to a first specific example.

FIG. 6 is a diagram schematically illustrating a higher parameter CSI-MeasConfig IE of the CSI framework according to the first specific example. IEs included in the CSI-MeasConfig IE will be described below as follows.

Information Related to Configuration of Channel State Information

In the CSI framework, transmission timing of the CSI included in the CSI report and the CSI report, and the like is determined based on the CSI-ReportConfig IE. The CSI-ReportConfig IE corresponds to the information related to the configuration of the first and second channel state information described above.

FIG. 7 is a diagram illustrating specific parameters included in the CSI-ReportConfig IE. As illustrated in FIG. 7, the CSI included in the CSI report is configured with a reportQuantity field of the CSI-ReportConfig IE. A configuration value of the field is "none", "cri-RI-PMI-CQI", "cri-RI-i1", "cri-RI-i1-CQI", "cri-RI-CQI", "cri-RSRP", "ssb-Index-RSRP", or "cri-RI-LI-PMI-CQI". Here, when "none" is configured, the CSI report is not transmitted by the terminal apparatus 200.

Specifically, the CSI configured with the reportQuantity field of the CSI-ReportConfig IE includes a channel quality indicator (CQI), a precoding matrix indicator (PMI), a CSI-RS resource indicator (CRI), an SS/PBCH block resource indicator (SSBRI), a layer indicator (LI), a rank indicator (RI), and/or layer 1 reference signal received power (L1-RSRP).

The transmission timing of the CSI report is configured with a reportConfigType field of the CSI-ReportConfig IE. The transmission timing of the CSI report has three types, namely aperiodic, semi-persistent, and periodic.

Measurement Target when Generating CSI Report

The transmission timing of the CSI-RS resource and the CSI-RS to be the measurement target when the CSI report is generated or the like is determined based on information CSI-ResourceConfig IE related to a configuration of the CSI resource.

Specifically, the resource of the measurement target configured with the CSI-ResourceConfig IE is a Channel State Information-Reference Signal (CSI-RS) and/or a Synchronisation Signal/Physical Broadcast CHannel block (SS/PBCH block).

FIG. 8 is a diagram illustrating specific parameters included in the CSI-ResourceConfig IE. When the CSI-RS is included in the measurement target, the transmission timing of the CSI-RS is, as illustrated in FIG. 8, configured with a resourceType field of the CSI-ResourceConfig IE. The transmission timing of the CSI-RS has three types, namely aperiodic, semi-persistent, and periodic. The transmission timing of the CSI-RS to be the measurement target when the aperiodic CSI report is generated may be any one of the three types described above.

At least one CSI-ResourceConfig IE is, as illustrated in FIG. 6, associated with one CSI-ReportConfig IE described above. The association is performed by configuring the same value for a resourcesForChannelMeasurement field of the CSI-ReportConfig IE and a csi-ResourceConfigId field of the CSI-ResourceConfig IE.

A combination of the CSI-RS resources to be the measurement target when one CSI report is generated is configured with a non-zero power CSI-RS resource set. The non-zero power CSI-RS resource set is configured with an NZP-CSI-RS-ResourceSet IE as illustrated in FIG. 9. FIG.

9 is a diagram illustrating specific parameters included in the NZP-CSI-RS-ResourceSet IE.

A combination of the SS/PBCH blocks to be the measurement target when one CSI report is generated is configured with a CSI-SSB-ResourceSet IE. The CSI-SSB resource set is associated with at least one SS/PBCH block. The association is, as illustrated in FIG. 6, performed by configuring an SS/PBCH block index for a csi-SSB-ResourceList field of the CSI-SSB-ResourceSet IE.

One CSI-ResourceConfig IE is associated with at least one non-zero power CSI-RS resource set and/or CSI-SSB resource set. The association with the non-zero power CSI-RS resource set is performed by configuring the same value for an element of an nzp-CSI-RS-ResourceSetList sub-field of the CSI-ResourceConfig IE and an nzp-CSI-ResourceSetId field of the NZP-CSI-RS-ResourceSet IE. The association with the CSI-SSB resource set is performed by configuring the same value for an element of a csi-SSB-ResourceSetList sub-field of the CSI-ResourceConfig IE and a csi-SSB-ResourceSetId field of the CSI-SSB-ResourceSet IE.

As illustrated in FIG. 8, when "semi-persistent" or "periodic" is configured in the resourceType field of the CSI-ResourceConfig IE, one CSI-ResourceConfig IE is associated with one non-zero power CSI-RS resource set and/or one CSI-SSB resource set. When "aperiodic" is configured for the resourceType field of the CSI-ResourceConfig IE, one CSI-ResourceConfig IE is associated with one or more non-zero power CSI-RS resource sets and/or one or more CSI-SSB resource sets. One non-zero power CSI-RS resource set or one CSI-SSB resource set to be the measurement target is selected out of the one or more candidate resource sets by a resourceSet sub-field or a csi-SSB-ResourceSet sub-field included in a CSI-AssociatedReportConfigInfo sub-field to be described later.

The number of antenna ports, resource mapping, or the like of the CSI-RS is configured with the non-zero power CSI-RS resource. The non-zero power CSI-RS resource is configured with an NZP-CSI-RS-Resource IE.

FIG. 10 is a diagram illustrating specific parameters included in the NZP-CSI-RS-Resource IE. The number of antenna ports and the physical resource block (PRB) of the CSI-RS and mapping of the resource elements (REs) in the PRB are configured with a resourceMapping field of the NZP-CSI-RS-Resource IE. A transmission period of the periodic CSI-RS or the semi-persistent CSI-RS and a slot offset in the transmission period are configured with a periodicityAndOffset field of the NZP-CSI-RS-Resource IE.

The non-zero power CSI-RS resource set is associated with at least one non-zero power CSI-RS resource. The association is, as illustrated in FIG. 6, performed by configuring the same value for an element of an nzp-CSI-RS-Resources field of the NZP-CSI-RS-ResourceSet IE and an nzp-CSI-RS-ResourceId field of the NZP-CSI-RS-Resource IE.

When "off" is configured for a repetition field of the NZP-CSI-RS-ResourceSet IE, the non-zero power CSI-RS resource set is associated with one or more non-zero power CSI-RS resources that are capable of simultaneous reporting of the L1-RSRP. When no value is configured for the field, the non-zero power CSI-RS resource set is associated with one or more non-zero power CSI-RS resources, one of which can be selected by the terminal.

Information Related to Second Aperiodic Trigger State

In a first example, 1 to 128 second aperiodic trigger states are configured with an aperiodicTriggerStateList field of the CSI-MeasConfig IE. Information related to a configuration of single second aperiodic trigger state is configured with a CSI-AperiodicTriggerState IE, and includes at least one CSI-AssociatedReportConfigInfo sub-field.

A single second aperiodic trigger state is associated with at least one piece of information related to a configuration of channel state information. The association is, as illustrated in FIG. 6, performed by configuring the same value for a reportConfigId sub-field of the CSI-AssociatedReportConfigInfo sub-field and a reportConfigId field of the CSI-ReportConfig IE. Here, the value configured for the reportConfigId sub-field corresponds to the second identification information. "Aperiodic" is configured for the reportConfigType field of the CSI-ReportConfig IE associated with the second aperiodic trigger state.

(Transmission Indication of Aperiodic CSI Report Based on Second Aperiodic Trigger State)

The transmission indication of the aperiodic CSI report based on the second aperiodic trigger state is performed by the base station configuring the value other than 0 for the CSI request field of DCI format 0_1 being the UL DCI. Here, the number of bits of the DCI field is specified within a range from 0 to 6 by a reportTriggerSize field in the CSI-MeasConfig IE. The bit value other than 0 of the DCI field corresponds to a maximum of $(2^{reportTriggerSize}-1)$ candidate aperiodic trigger states. In this manner, one aperiodic trigger state can be selected by using the DCI field out of a maximum of 63 candidates. In contrast, a maximum of 128 aperiodic trigger states can be configured for the aperiodicTriggerStateList field in the CSI-MeasConfig IE. Thus, when the number of configured aperiodic trigger states exceeds 63, a maximum of 63 aperiodic trigger states is selected by using the Medium Access Control-Control Element (MAC-CE).

When the UL DCI includes indication information of the aperiodic CSI report, the configuration of the second channel state information follows the CSI-ReportConfig 1E that is associated with the indicated aperiodic trigger state. The configuration related to the CSI-RS and/or SS/PBCH block of the measurement target follows the CSI-ResourceConfig IE, the NZP-CSI-RS-ResourceSet IE, the CSI-SSB-ResourceSet IE, and/or the NZP-CSI-RS-Resource IE that is associated with the CSI-ReportConfig 1E in a linked manner.

Information Related to First Aperiodic Trigger State

The information related to the configuration of the first aperiodic trigger state is configured using a CSI-AperiodicOnPUCCHTriggerState IE. Here, the same value is configured for a csi-AperiodicTriggerStateId field of the CSI-AperiodicOnPUCCHTriggerState IE and the csi-AperiodicTriggerStateId field of the CSI-AperiodicTriggerState IE. csi-AperiodicTriggerStateId corresponds to the first identification information. Specifically, by configuring csi-AperiodicTriggerStateId as described above, csi-AperiodicTriggerStateId can be assumed as information for identifying the second aperiodic trigger state corresponding to the first aperiodic trigger state out of a plurality of second aperiodic trigger states. In this manner, a common aperiodic trigger state can be used between the first aperiodic trigger state and the second aperiodic trigger state.

When a common aperiodic trigger state is used as described above, information related to a configuration of the same channel state information associated with the aperiodic trigger state is selected. Specifically, the CSI-ReportConfig IE associated with the first aperiodic trigger state is identified by the reportConfigId sub-field of the CSI-AperiodicTriggerState IE in which the information related to the configuration of the second aperiodic trigger state associated with the first aperiodic trigger state is configured.

(Transmission Indication of Aperiodic CSI Report Based on First Aperiodic Trigger State)

When the transmission indication of the CSI report based on the first aperiodic trigger state is performed by using the DL DCI, for example, DCI format 1_0 and/or DCI format 1_1 may include a DCI field for performing the transmission indication of the CSI report that is based on the first aperiodic trigger state. The base station 100 may indicate transmission of the first aperiodic CSI report for the terminal apparatus by configuring the value other than 0 for the DCI field.

Figure 11:
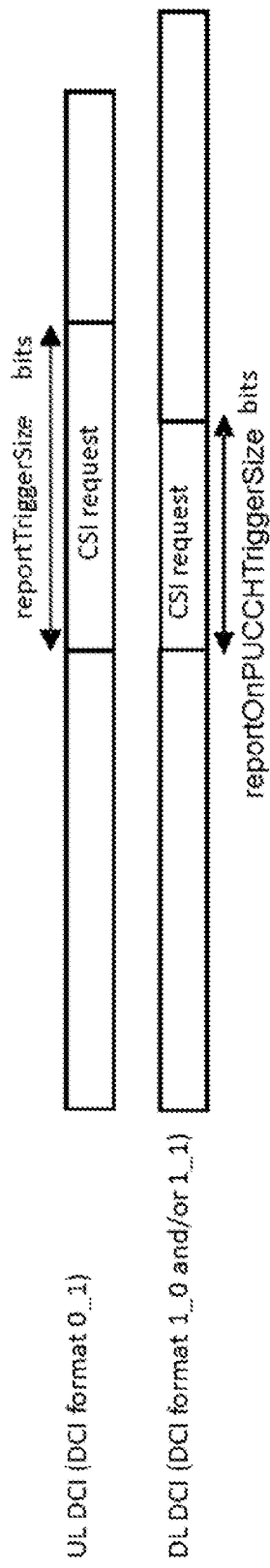
FIG. 11 is a diagram for illustrating the number of bits of a CSI request field included in DCI.

The number of bits of the DCI field may be determined by the reportTriggerSize field of the CSI-MeasConfig IE, in a manner similar to the case where the transmission indication of the CSI report based on the second aperiodic trigger state is performed by using the UL DCI. The number of bits of the UL DCI field may be determined by using another higher layer parameter. For example, as illustrated in FIG. 11, the number of bits of the DCI field may be determined according to a reportOnPUCCHTriggerSize field. FIG. 11 is a diagram for illustrating the number of bits of the CSI request field included in the DCI.

As in the manner described above, according to the first example, a set of the first aperiodic trigger states is a subset of a set of the second aperiodic trigger states. With this configuration, increase in overhead of the RRC message can be prevented.

(3) Second Specific Example

As a second specific example, the information related to the configuration of the aperiodic trigger state may be information that is not associated with the information related to the configuration of the second aperiodic trigger state.

Figure 12:
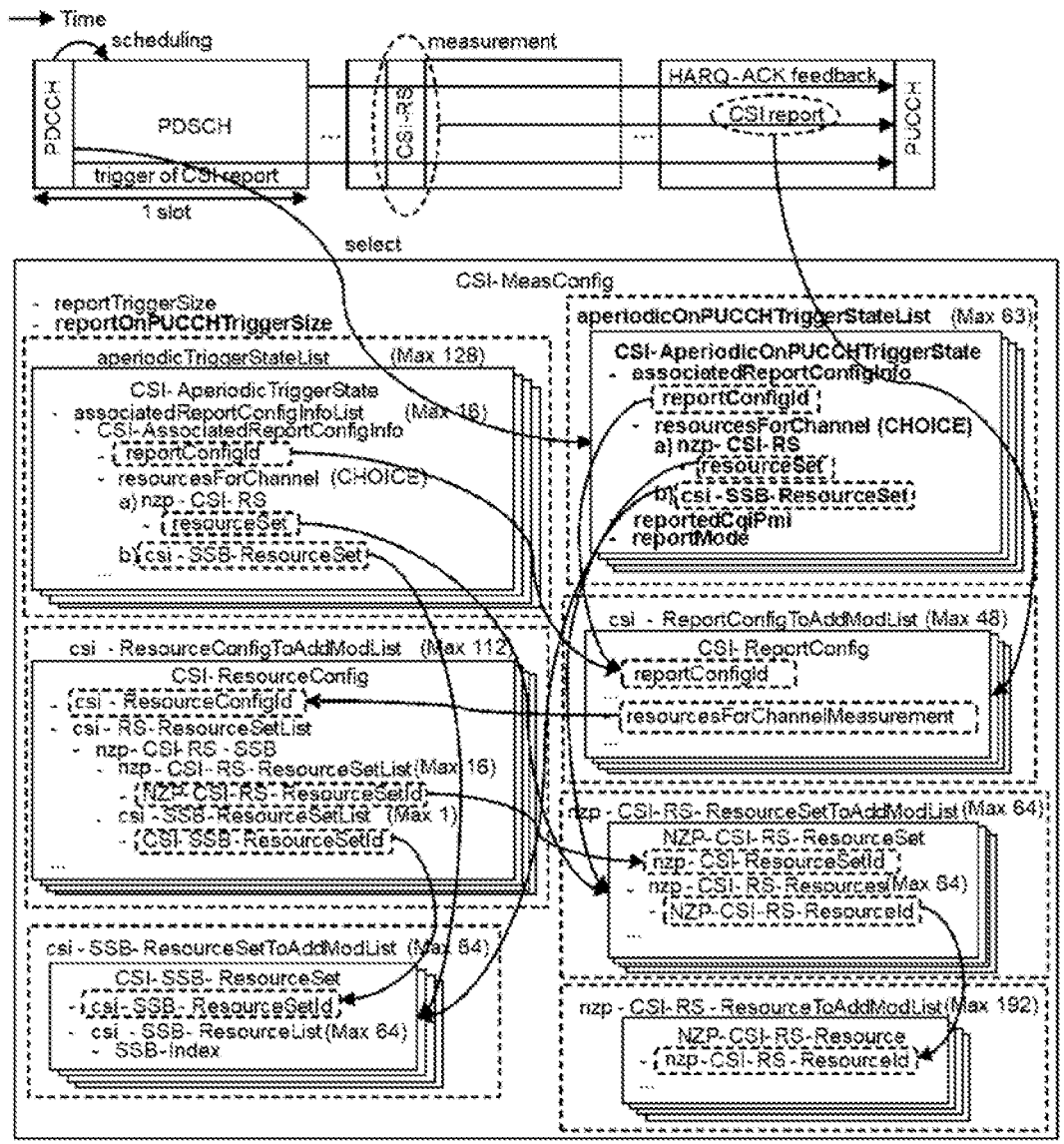
FIG. 12 is a diagram schematically illustrating the higher parameter CSI-MeasConfig IE of the CSI framework according to a second specific example.

FIG. 12 is a diagram schematically illustrating the higher parameter CSI-MeasConfig IE of the CSI framework according to the second specific example.

The higher parameter CSI-MeasConfig IE of the CSI framework according to the second specific example is different from the higher parameter CSI-MeasConfig IE of the CSI framework according to the first specific example described above in the following aspect. Specifically, the CSI-AperiodicOnPUCCHTriggerState IE in which the information related to the configuration of the first aperiodic trigger state is configured includes an associatedReportConfigInfo field. In this manner, the CSI-AperiodicOnPUCCHTriggerState IE is not associated with the CSI-AperiodicTriggerState IE in which the information related to the configuration of the second aperiodic trigger state is configured.

In particular, in the second specific example, the information related to the configuration of the first aperiodic trigger state includes third identification information for identifying the information related to the configuration of the first channel state information corresponding to the first aperiodic trigger state. Specifically, by configuring the same value for the reportConfigId sub-field of the CSI-AperiodicOnPUCCHTriggerState IE and the reportConfigId field of the CSI-ReportConfig IE, the information related to the configuration of the first aperiodic trigger state and the configuration related to the first channel state information are associated with each other. Specifically, the reportConfigId sub-field of the CSI-AperiodicOnPUCCHTriggerState IE corresponds to the third identification information.

Note that definition of the sub-field included in the associatedReportConfigInfo field may be the same as the definition of the sub-field included in the CSI-AssociatedReportConfigInfo sub-field of the CSI-AperiodicTriggerState IE. Specifically, the associatedReportConfigInfo field may include the resourceSet sub-field or the csi-SSB-ResourceSet sub-field, in addition to the reportConfigId sub-field.

(4) Procedure of Processing

Figure 13:
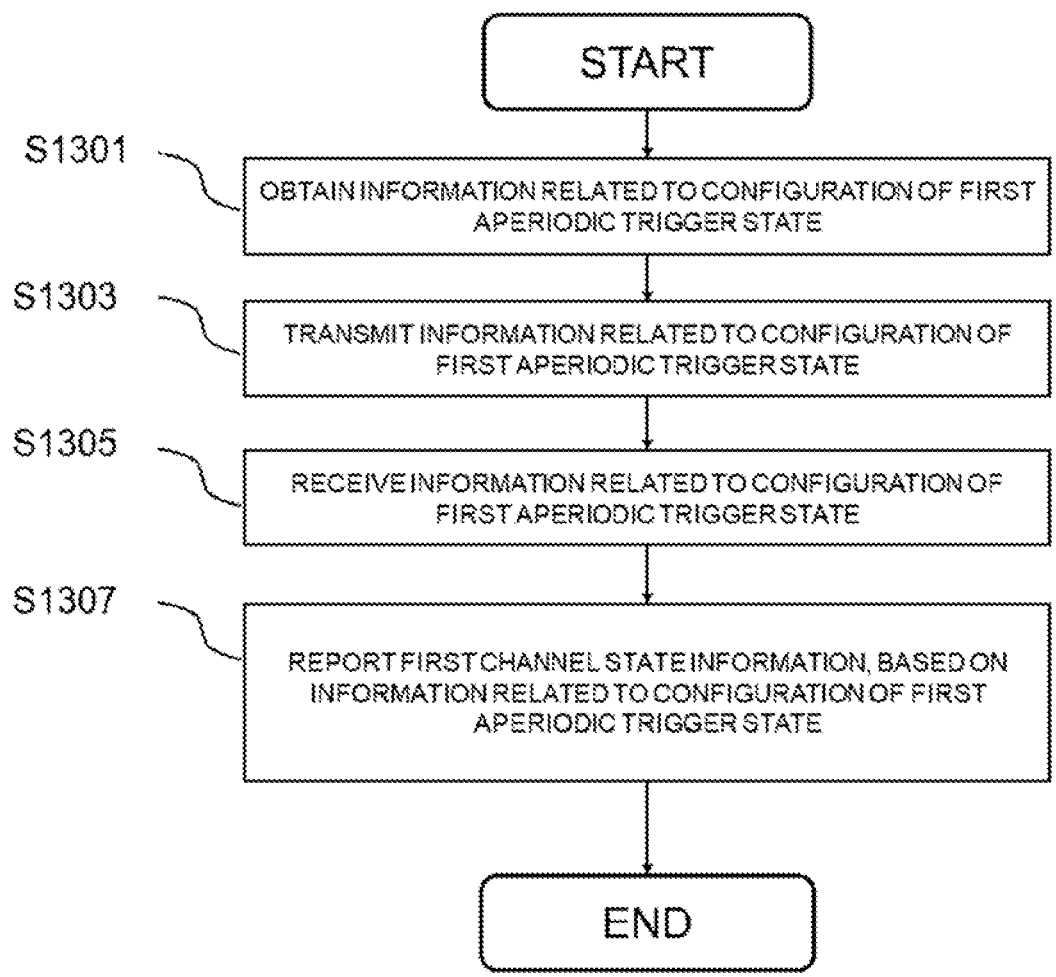
FIG. 13 is a flowchart for illustrating an example of a general procedure of signaling processing of an RRC message according to the first example embodiment.

With reference to FIG. 13, an example of a procedure of signaling processing of the RRC message according to the first example embodiment will be described. FIG. 13 is a flowchart for illustrating an example of a general procedure of signaling processing of the RRC message according to the first example embodiment.

In Step S1301, the base station 100 (obtaining unit 141) obtains the information related to the configuration of the first aperiodic trigger state. In Step S1303, the base station 100 (obtaining unit 141) transmits the RRC message including the information related to the configuration of the first aperiodic trigger state to the terminal apparatus 200. In Step S1305, the terminal apparatus 200 (receiving processing unit 231) receives the RRC message including the information related to the configuration of the first aperiodic trigger state from the base station 100. In Step S1307, the terminal apparatus 200 (transmitting processing unit 233) specifies information related to measurement of the first channel state information or the like from the base station 100, based on the information related to the configuration of the first aperiodic trigger state, and reports (transmits) the first channel state information to the base station 100 by using the specified information.

(5) Contents of CSI Report According to First Aperiodic Trigger State

The first channel state information may include information related to an update content with reference to a channel state specified by the second channel state information.

For example, the first channel state information included in the CSI report indicated by the DL DCI may be additional information indicating the update content with reference to the channel state specified by the CSI report that is previously transmitted by the terminal apparatus.

Figure 14:
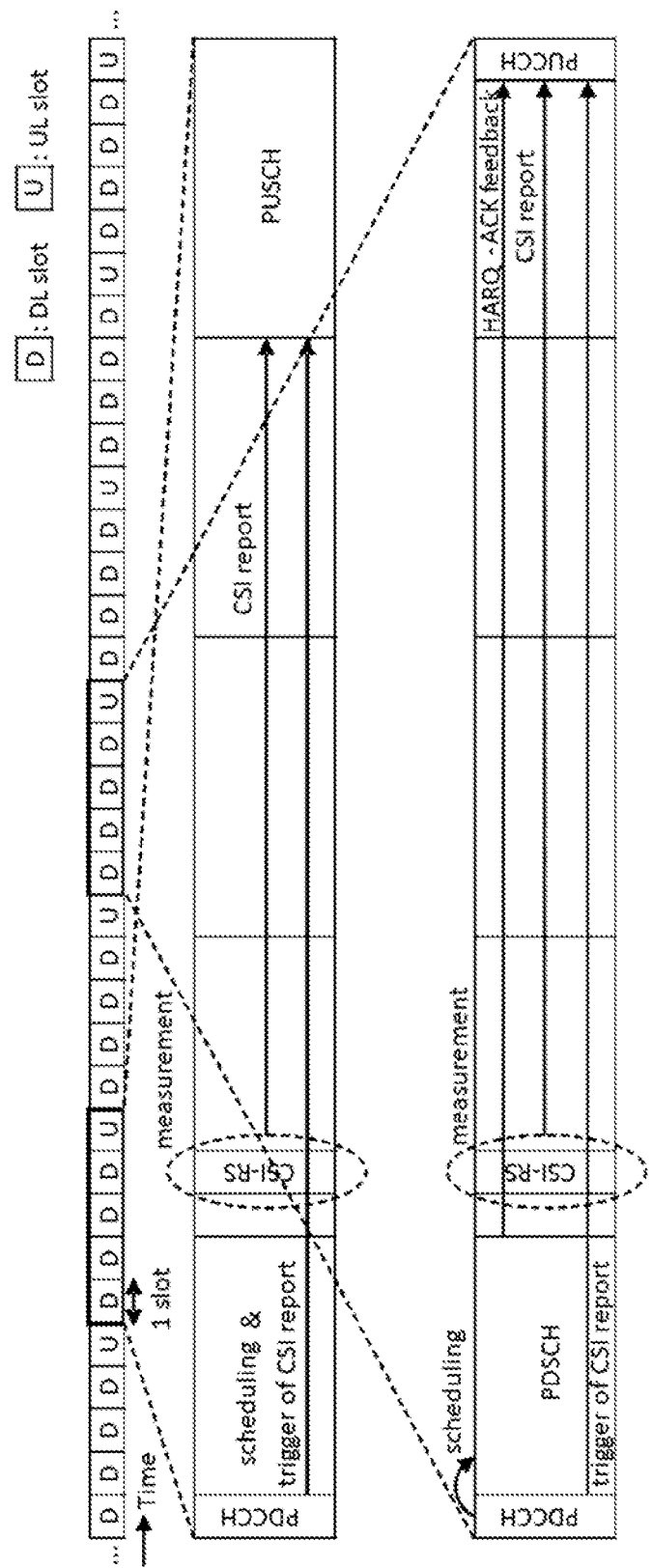
FIG. 14 is a diagram for illustrating indication of an aperiodic CSI report by using UL DCI and DL DCI.

FIG. 14 is a diagram for illustrating indication of the aperiodic CSI report by using the UL DCI and the DL DCI. As illustrated in FIG. 14, first, the CSI report (the second channel state information) indicated based on the second aperiodic trigger state by using the UL DCI is transmitted on the PUSCH. Next, the first channel state information included in the CSI report indicated based on the first aperiodic trigger state by using the DL DCI may be transmitted on the PUCCH. In the example, the first channel state information included in the CSI report transmitted on the PUCCH is additional information indicating the update content with reference to the channel state that is specified by the second channel state information included in the CSI report transmitted on the PUSCH.

Note that the previously transmitted CSI report is not limited to the CSI report that is indicated by the UL DCI by using the same aperiodic trigger state as that of the DL DCI. For example, the previously transmitted CSI report may be the CSI report that is last transmitted by the terminal apparatus 200 out of all of the CSI reports including the periodic CSI report and the semi-persistent CSI report.

(5-1) Example of Case where CQI and PMI are Included

The information related to the update content may include information related to a difference of the CQI (hereinafter also referred to as differential CQI information) with reference to the CQI that is specified by the second channel state information.

The information related to the update content may include information related to a part of the PMI (hereinafter also referred to as partial PMI information) with reference to the PMI that is specified by the second channel state information.

In addition, the information related to the first aperiodic trigger state may include information related to the number of bits representing the information related to the update content.

Specific Example

When a Wideband CQI and a Wideband PMI are reported, a CRI, an RI, an LI, a Wideband PMI $i_1$, a Wideband PMI $i_2$, and/or a Wideband CQI is reported according to the reportQuantity field of the CSI-ReportConfig IE as illustrated in FIG. 7. In this case, the format of the CSI report follows Table 1.

TABLE 1

| CSI FIELD | reportQuantity |
|---|---|
| CRI | cri-RI-PMI-CQI, cri-RI-i1, cri-RI-i1-CQI, cri-RI-CQI, cri-RI-LI-PMI-CQI |
| RI | cri-RI-PMI-CQI, cri-RI-i1, cri-RI-i1-CQI, cri-RI-CQI, cri-RI-LI-PMI-CQI |
| LI | cri-RI-LI-PMI-CQI |
| Zero padding | ZERO PADDING TO KEEP NUMBER OF BITS FIXED |
| Wideband PMI $i_1$ | cri-RI-PMI-CQI, cri-RI-i1, cri-RI-i1-CQI, cri-RI-LI-PMI-CQI |
| Wideband PMI $i_2$ | cri-RI-PMI-CQI, cri-RI-LI-PMI-CQI |
| Wideband CQI | cri-RI-PMI-CQI, cri-RI-i1-CQI, cri-RI-CQI, cri-RI-LI-PMI-CQI |

(CQI)

Here, the Wideband CQI included in the second channel state information is represented by a CQI index of 4 bits as illustrated in Table 2, for example. The CQI index is an index for the terminal apparatus 200 to specify a modulation scheme and a coding rate with which a predetermined block error rate can be achieved.

TABLE 2

| CQI INDEX | MODULATION SCHEME | CODING RATE (x 1024) | SPECTRAL EFFICIENCY |
|---|---|---|---|
| 0 | | N/A | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |

TABLE 2-continued

| CQI INDEX | MODULATION SCHEME | CODING RATE (x 1024) | SPECTRAL EFFICIENCY |
|---|---|---|---|
| 14 | 64QAM | 873 | 5.1152 |
| 15 | 64QAM | 948 | 5.5547 |

In contrast, a differential CQI index (differential CQI information) with reference to the CQI index included in the second channel state information previously transmitted by the terminal apparatus 200 by the first channel state information may be reported. For example, the differential CQI of 2 bits may be reported, and each of the values may correspond to the differential CQI index as illustrated in Table 3.

TABLE 3

| DIFFERENTIAL CQI | DIFFERENTIAL CQI INDEX |
|---|---|
| 0 | 0 |
| 1 | ≥1 |
| 2 | −1 |
| 3 | ≤−2 |

Here, it may be assumed that information other than the CQI included in the first channel state information is the same as the information included in the CSI report previously transmitted by the terminal apparatus 200. When the first channel state information includes the partial PMI information, the differential CQI information may be generated assuming application of the precoding matrix determined based on the partial PMI information.

When the base station 100 receives the first channel state information included in the CSI report together with a Negative ACKnowledgement (NACK) for the PDSCH, the base station 100 may determine the MCS, the number of PRBs, and the number of OFDM symbols that are used at the time of retransmission of the PDSCH by taking the value of the reported differential CQI index (the differential CQI information) into consideration.

For example, when the base station 100 receives the differential CQI information that satisfies a condition of "differential CQI index ≥1", the base station 100 may perform retransmission of the PDSCH by using the MCS, the number of PRBs, and the number of OFDM symbols with which the coding rate is increased as compared to the case of the previous transmission. When the base station 100 receives the differential CQI information that satisfies a condition of "differential CQI index ≤−2", the base station 100 may perform retransmission of the PDSCH by using the MCS, the number of PRBs, and the number of OFDM symbols with which the coding rate is decreased as compared to the case of the previous transmission.

The differential CQI information included in the first channel state information may be the differential CQI index of 1 bit as illustrated in Table 4. In this case, the case where the bit value is 1 indicates that the CQI is deteriorated as compared to the case of the previous reporting. In this case, when the base station 100 receives the differential CQI information that satisfies a condition of "differential CQI index ≤−1", the base station 100 may perform retransmission of the PDSCH by using the MCS, the number of PRBs, and the number of OFDM symbols with which the coding rate is decreased as compared to the case of the previous transmission.

TABLE 4

| BIT VALUE | DIFFERENTIAL CQI INDEX |
|---|---|
| 0 | ≥0 |
| 1 | ≤−1 |

The number of bits of the differential CQI information may be determined by the higher layer parameter (information related to the configuration of the first aperiodic trigger state) that is configured for each aperiodic trigger state. For example, the number of bits of the differential CQI information may be determined by a reportMode field in the CSI-AperiodicOnPUCCHTriggerState IE illustrated in FIG. 6 and FIG. 12.

Specifically, when "mode 1" is configured for the reportMode field, the differential CQI information of 1 bit may be reported, and when "mode 2" is configured, the differential CQI information of 2 bits may be reported.

(PMI)

The wideband PMIs $i_1$ and $i_2$ included in the second channel state information are each an index for specifying the precoding matrix. For example, the details of the wideband PMIs $i_1$ and $i_2$ are described in Section 5.2.2.2.1 of Literature 1 described above. In the precoding matrix, $i_1$ may be interpreted as an index for specifying a component that may vary with a long period, and $i_2$ may be interpreted as an index for specifying a component that may vary with a short period.

In contrast, the partial PMI information included in the first channel state information may be $i_2$. The number of bits of $i_2$ may be determined according to a rank based on the RI included in the previously transmitted CSI report and a codebookMode sub-field included in the CSI-ReportConfig IE, as illustrated in Table 5.

TABLE 5

| RANK | codebookMode | NUMBER OF BITS OF $i_2$ |
|---|---|---|
| 1 | 1 | 2 |
|   | 2 | 4 |
| 2 | 1 | 1 |
|   | 2 | 3 |
| 3~8 | 1, 2 | 1 |

The partial PMI information included in the first channel state information may include only a co-phasing factor n. Here, the co-phasing factor n is a complex coefficient to be multiplied to a predetermined element in the precoding matrix, and is expressed as in Expression 1, for example.

$$\varphi_n = e^{j\pi n/2} \quad \text{[Expression 1]}$$

The range of n defined in NR release 15 is 0, 1, 2, or 3 when rank=1, and is 0 or 1 when rank >1. The details are described in Section 5.2.2.2.1 of Literature 1 described above, for example. When the partial PMI information includes only the co-phasing factor n, as illustrated in Table 6, the partial PMI information having a maximum of 2 bits may be reported according to the rank based on the RI included in the previously transmitted CSI report.

TABLE 6

| RANK | NUMBER OF BITS OF CO-PHASING FACTOR IN $i_2$ |
|---|---|
| 1 | 2 |
| 2~8 | 1 |

The number of bits of the partial PMI information may be determined by the higher layer parameter (information related to the configuration of the first aperiodic trigger state) that is configured for each aperiodic trigger state. For example, the number of bits of the partial PMI information may be determined by the reportMode field in the CSI-AperiodicOnPUCCHTriggerState IE illustrated in FIG. 6 and FIG. 12. Specifically, when "mode 1" is configured for the reportMode field, the partial PMI information having the number of bits illustrated in Table 5 may be reported, and when "mode 2" is configured, the partial PMI information having the number of bits illustrated in Table 6 may be reported.

(Presence or Absence of Information Related to Update Content)

The information related to the first aperiodic trigger state may include information related to whether or not the first channel state information includes the information related to the update content. Specifically, including both or one of the differential CQI information and the partial PMI information in the first channel state information may be indicated by using a higher layer parameter. For example, the indication may be performed by a reportedCqiPmi field in the CSI-AperiodicOnPUCCHTriggerState IE illustrated in FIG. 6 and FIG. 12. Specifically, when "cqi" is configured for the reportedCqiPmi field, only the differential CQI information is included in the first channel state information. When "pmi" is configured, only the partial PMI information is included in the first channel state information. When "cqiPmi" is configured, both of the differential CQI information and the partial PMI information are included in the first channel state information.

When the first channel state information includes only the partial PMI information, the terminal apparatus 200 may transmit the first channel state information including the partial PMI information with which the CQI index is the largest. When both of the differential CQI information and the partial PMI information are included in the first channel state information, the bits of the differential CQI information and the partial PMI information may be multiplexed through concatenation.

(5-2) Example of Case where L1-RSRP is Included

The information related to the update content may include information (hereinafter also referred to as L1-RSRP order information) related to the order of the L1-RSRP with reference to the L1-RSRP that is specified by the second channel state information.

Specific Example

The L1-RSRP is, for example, reported when "cri-RSRP" or "ssb-Index-RSRP" is configured for the reportQuantity field of the CSI-ReportConfig IE. The L1-RSRP represents received power of the CSI-RS or the SS/PBCH block, and is used by the terminal apparatus 200 to report an appropriate downlink transmit beam.

When transmission indication of the second channel state information is performed by using the UL DCI, the terminal apparatus 200 reports the L1-RSRP together with one to four CRIs or SSBRIs corresponding to the non-zero power CSI-RS resource or the SS/PBCH block according to the configuration value of an nrofReportedRS sub-field of the CSI-ReportConfig IE. Here, when non-zero power CSI-RS resources or SS/PBCH blocks more than the number according to the configuration value are configured, the terminal apparatus 200 selects one to four out of the configured candidates. In this case, the format of the CSI report including the first channel state information follows Table 7.

TABLE 7

| CSI FIELD |
| --- |
| FIRST CRI OR SSBRI |
| SECOND CRI OR SSBRI |
| THIRD CRI OR SSBRI |
| FOURTH CRI OR SSBRI |
| L1-RSRP CORRESPONDING TO FIRST CRI OR SSBRI |
| DIFFERENTIAL L1-RSRP CORRESPONDING TO SECOND CRI OR SSBRI |
| DIFFERENTIAL L1-RSRP CORRESPONDING TO THIRD CRI OR SSBRI |
| DIFFERENTIAL L1-RSRP CORRESPONDING TO FOURTH CRI OR SSBRI |

The first CRI or SSBRI corresponds to the non-zero power CSI-RS resource or the SS/PBCH block with which the L1-RSRP is the largest. The L1-RSRP is reported with a value of 7 bits within a range from −140 dBm to −44 dBm, in pitch width of 1 dB. The L1-RSRP corresponding to the second to fourth CRIs or SSBRIs is a differential value from the L1-RSRP corresponding to the first CRI or SSBRI, and is reported with a value of 4 bits in pitch width of 2 dB.

Here, when transmission of the first channel state information is indicated based on the first aperiodic trigger state by using the DL DCI, the L1-RSRP order information included in the first channel state information may be, as illustrated in Table 8, a bit value for identifying one CRI or SSBRI with which the L1-RSRP is the largest of the one to four CRIs or SSBRIs that are last reported by the terminal apparatus 200. In this case, ceil(log 2N) bits may be used as the number of bits of the L1-RSRP order information, where N represents the number of simultaneously reportable CRIs or SSBRIs based on the nrofReportedRS sub-field of the CSI-ReportConfig IE. For example, the number of bits is 1 bit when N=2.

TABLE 8

| CSI FIELD | CSI FIELD |
| --- | --- |
| 0 | CRI OR SSBRI REPORTED FIRST IN PREVIOUS CASE |
| 1 | CRI OR SSBRI REPORTED SECOND IN PREVIOUS CASE |
| 2 | CRI OR SSBRI REPORTED THIRD IN PREVIOUS CASE |
| 3 | CRI OR SSBRI REPORTED FOURTH IN PREVIOUS CASE |

The L1-RSRP order information may be, as illustrated in Table 9, a bit value for identifying one CRI or SSBRI with which the L1-RSRP is the largest out of the first and second CRIs or SSBRIs that are last reported by the terminal apparatus 200.

TABLE 9

| BIT VALUE | CSI FIELD |
| --- | --- |
| 0 | CRI OR SSBRI REPORTED FIRST IN PREVIOUS CASE |
| 1 | CRI OR SSBRI REPORTED SECOND IN PREVIOUS CASE |

The number of bits of the L1-RSRP order information may be determined by the higher layer parameter (information related to the configuration of the first aperiodic trigger state) that is configured for each aperiodic trigger state. For example, the number of bits of the L1-RSRP order information may be determined by the reportMode field in the CSI-AperiodicOnPUCCHTriggerState IE illustrated in FIG. 6 and FIG. 12. Specifically, when "mode 1" is configured for the reportMode field, the L1-RSRP order information of 1 bit may be reported, and when "mode 2" is configured, the L1-RSRP order information of 2 bits may be reported.

Figure 15A:
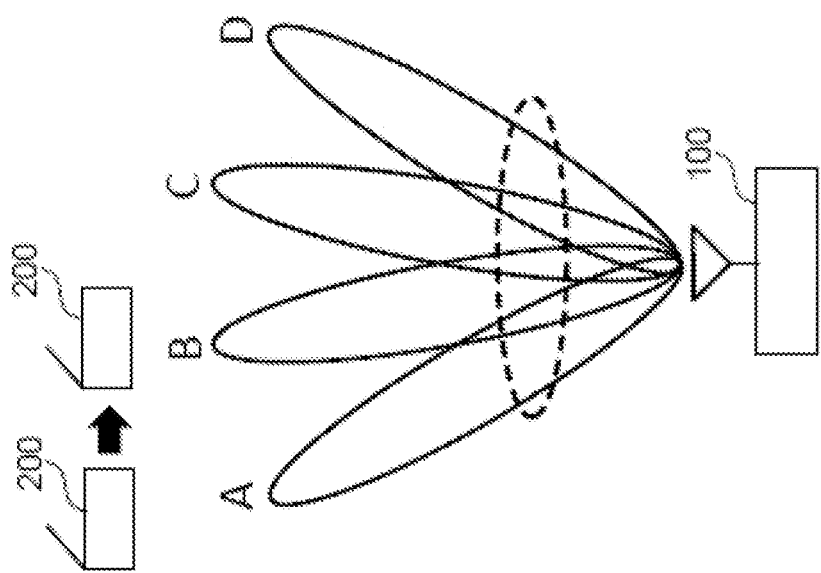
FIG. 15A is a diagram for illustrating downlink transmit beams when L1-RSRP is reported.
Figure 15B:
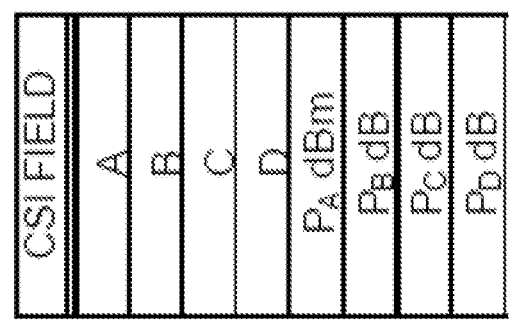
FIG. 15B is a diagram for illustrating downlink transmit beams when L1-RSRP is reported.
Figure 15C:
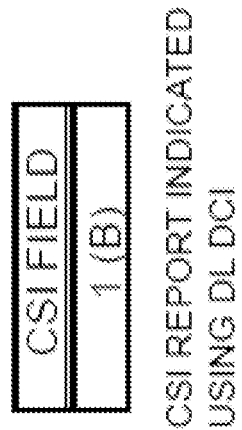
FIG. 15C is a diagram for illustrating downlink transmit beams when L1-RSRP is reported.

FIGS. 15A to 15C are diagrams for illustrating downlink transmit beams when the L1-RSRP is reported. For example, as illustrated in FIG. 15A, a case in which the terminal apparatus moves and the downlink transmit beam with which the L1-RSRP is the largest is switched is assumed. Here, it is assumed that the terminal apparatus reports the L1-RSRP for four CRIs or SSBRIs of A to D in the previous CSI report as illustrated in FIG. 15B, for example. Subsequently, when the downlink transmit beam with which the L1-RSRP is the largest is switched from A to B due to movement of the terminal apparatus, the DL DCI includes indication information for indicating reporting of the first channel state information based on the first aperiodic trigger state. In this case, for example, as illustrated in FIG. 15C, the bit value of "1" is reported in a report of the first channel state information. This indicates that the L1-RSRP for B being the second CRI or SSBRI is the largest out of the previously reported four CRIs or SSBRIs of A to D. In this manner, the base station 100 can recognize that the downlink transmit beam appropriate for the terminal apparatus 200 has switched from A to B. Based on these results, the base station 100 may instantaneously switch the downlink transmit beam to be used for the next transmission of the PDSCH. The base station 100 may perform transmission indication of the report of the second channel state information based on the second aperiodic trigger state by using the UL DCI, and cause the terminal apparatus 200 to transmit the CSI report including the RI, the CQI, and/or the PMI for the downlink transmit beam after switch.

4. Second Example Embodiment

Next, with reference to FIG. 16 and FIG. 17, a second example embodiment according to the present invention will be described. The above-described first example embodiment is a concrete example embodiment, whereas the second example embodiment is a more generalized example embodiment.

<4.1. Configuration of Base Station>

Figure 16:
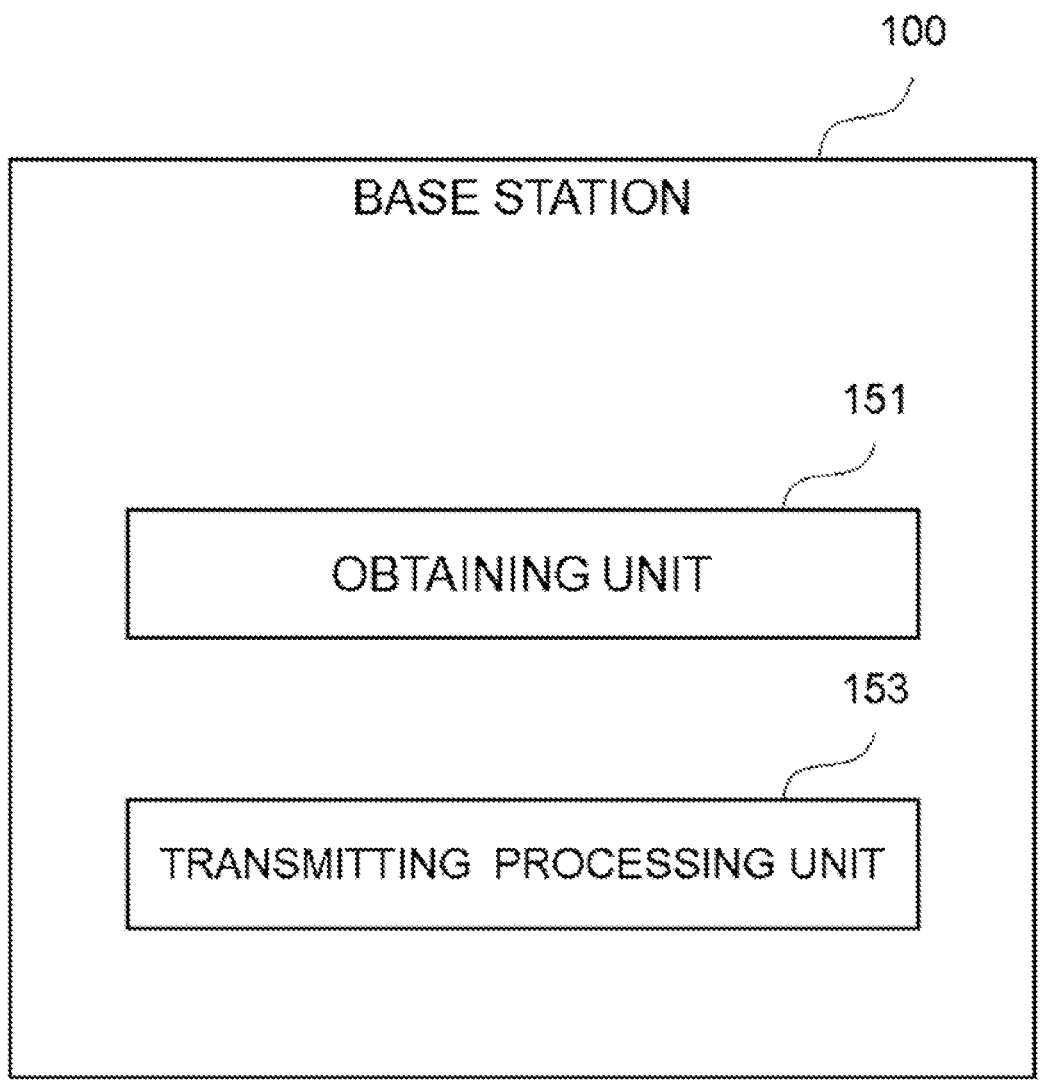
FIG. 16 is a block diagram illustrating an example of a schematic configuration of a base station 100 according to a second example embodiment.

With reference to FIG. 16, an example of a configuration of the base station 100 according to the second example embodiment will be described. FIG. 16 is a block diagram illustrating an example of a schematic configuration of the base station 100 according to the second example embodiment. With reference to FIG. 16, the base station 100 includes an obtaining unit 151 and a transmitting processing unit 153.

Specific operation of the obtaining unit 151 and the transmitting processing unit 153 will be described later.

The obtaining unit 151 and the transmitting processing unit 153 may be implemented with a baseband (BB) processor and/or another processor or the like. The obtaining unit 151 and the transmitting processing unit 153 may be implemented with the same processor, or may be implemented with separate processors.

The base station 100 may include a memory that stores a program, and one or more processors that can execute the program, and the one or more processors may perform the operation of the obtaining unit 151 and the transmitting processing unit 153. The program may be a program for causing the one or more processors to execute the operation of the obtaining unit 151 and the transmitting processing unit 153.

<4.2. Configuration of Terminal Apparatus>

Figure 17:
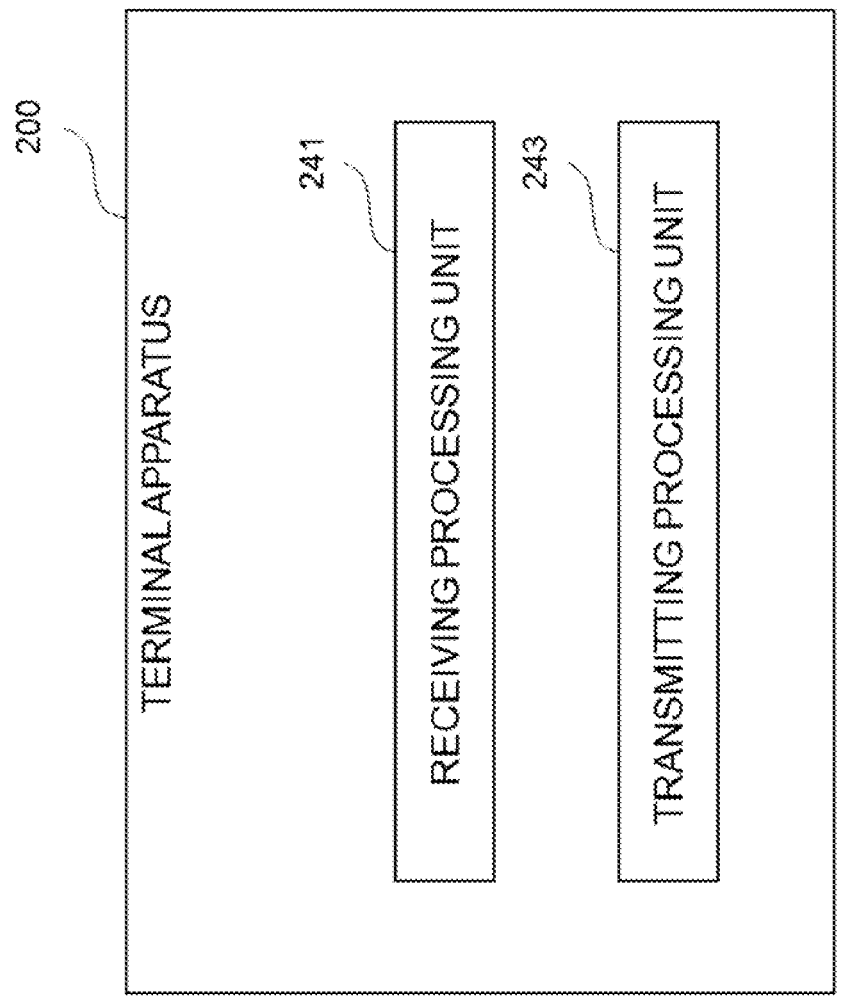
FIG. 17 is a block diagram illustrating an example of a schematic configuration of a terminal apparatus 200 according to the second example embodiment.

With reference to FIG. 17, an example of a configuration of the terminal apparatus 200 according to the second example embodiment will be described. FIG. 17 is a block diagram illustrating an example of a schematic configuration of the terminal apparatus 200 according to the second example embodiment. With reference to FIG. 17, the terminal apparatus 200 includes a receiving processing unit 241 and a transmitting processing unit 243.

Specific operation of the receiving processing unit 241 and the transmitting processing unit 243 will be described later.

The receiving processing unit 241 and the transmitting processing unit 243 may be implemented with a baseband (BB) processor and/or another processor or the like. The receiving processing unit 241 and the transmitting processing unit 243 may be implemented with the same processor, or may be implemented with separate processors.

The terminal apparatus 200 may include a memory that stores a program, and one or more processors that can execute the program, and the one or more processors may perform the operation of the receiving processing unit 241 and the transmitting processing unit 243. The program may be a program for causing the one or more processors to execute the operation of the receiving processing unit 241 and the transmitting processing unit 243.

<4.3. Technical Features>

Next, technical features according to the second example embodiment will be described. The above-described first example embodiment is a concrete example embodiment, whereas the second example embodiment is a more generalized example embodiment.

Base Station

The base station 100 (obtaining unit 151) obtains information related to a configuration of a first aperiodic trigger state for the terminal apparatus 200 to aperiodically report the first channel state information by using the Physical Uplink Control Channel (PUCCH). Then, the base station 100 (transmitting processing unit 153) transmits a Radio Resource Control (RRC) message including the information related to the configuration of the first aperiodic trigger state to the terminal apparatus 200.

The obtaining unit 151 may perform operation the same as the operation of the obtaining unit 141 according to the first example embodiment described above. The transmitting processing unit 153 may perform operation the same as the operation of the transmitting processing unit 143 according to the first example embodiment described above.

Terminal Apparatus

The terminal apparatus 200 (receiving processing unit 241) receives the Radio Resource Control (RRC) message including the information related to the configuration of the first aperiodic trigger state from the base station 100. Then, the terminal apparatus 200 (transmitting processing unit 243) transmits the first channel state information to the base station 100 by using the PUCCH, based on the information related to the configuration of the first aperiodic trigger state.

The receiving processing unit 241 may perform operation the same as the operation of the receiving processing unit 231 according to the first example embodiment described above. The transmitting processing unit 243 may perform operation the same as the operation of the transmitting processing unit 233 according to the first example embodiment described above.

As in the manner described above, the Radio Resource Control (RRC) message including the information related to the configuration of the first aperiodic trigger state is transmitted from the base station 100 to the terminal apparatus 200. In this manner, the information related to the configuration for reporting the aperiodic channel state information using the PUCCH can be appropriately signaled from the base station 100 to the terminal apparatus 200.

5. Other Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be carried out in time series in the order described in the corresponding sequence diagram. For example, the steps in the processing may be carried out in an order different from that described in the corresponding sequence diagram or may be carried out in parallel. Some of the steps in the processing may be deleted, or more steps may be added to the processing.

An apparatus including constituent elements (e.g., the obtaining unit, the transmitting processing unit, and/or the receiving processing unit) of the base station 100 described in the Specification (e.g., one or more apparatuses (or units) among a plurality of apparatuses (or units) constituting the base station or a module for one of the plurality of apparatuses (or units)) may be provided. An apparatus including the constituent elements (e.g., the transmitting processing unit and/or the receiving processing unit) of the terminal apparatus described in the Specification (e.g., a module for the terminal apparatus) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A base station comprising:

an obtaining unit configured to obtain information related to a configuration of a first aperiodic trigger state for a terminal apparatus to aperiodically report first channel state information by using a Physical Uplink Control Channel (PUCCH); and a transmitting processing unit configured to transmit, to the terminal apparatus, a Radio Resource Control (RRC) message including the information related to the configuration of the first aperiodic trigger state.

(Supplementary Note 2)

The base station according to supplementary note 1, wherein the obtaining unit is configured to further obtain information related to a configuration of a second aperiodic trigger state for the terminal apparatus to aperiodically report second channel state information by using a Physical Uplink Shared Channel (PUSCH), and the transmitting processing unit is configured to transmit, to the terminal apparatus, a Radio Resource Control (RRC) message including the information related to the configuration of the first aperiodic trigger state and the information related to the configuration of the second aperiodic trigger state.

(Supplementary Note 3)

The base station according to supplementary note 2, wherein the information related to the configuration of the first aperiodic trigger state includes first identification information for identifying the first aperiodic trigger state from a plurality of candidate aperiodic trigger states.

(Supplementary Note 4)

The base station according to supplementary note 3, wherein the obtaining unit is configured to obtain information related to a configuration of a plurality of second aperiodic trigger states, and the first identification information is information for identifying, from the plurality of second aperiodic trigger states, a second aperiodic trigger state associated with the first aperiodic trigger state.

(Supplementary Note 5)

The base station according to supplementary note 4, wherein the information related to the configuration of the second aperiodic trigger state includes second identification information for identifying information related to a configuration of the second channel state information associated with the second aperiodic trigger state, and information related to a configuration of the first channel state information associated with the first aperiodic trigger state is identified based on the second identification information included in the information related to the configuration of the second aperiodic trigger state associated with the first aperiodic trigger state.

(Supplementary Note 6)

The base station according to supplementary note 2, wherein the information related to the configuration of the first aperiodic trigger state is information not associated with the information related to the configuration of the second aperiodic trigger state.

(Supplementary Note 7)

The base station according to supplementary note 6, wherein the information related to the configuration of the first aperiodic trigger state includes third identification information for identifying information related to a configuration of the first channel state information corresponding to the first aperiodic trigger state.

(Supplementary Note 8)

The base station according to any one of supplementary notes 2 to 7, wherein the first channel state information includes information related to an update content with reference to a channel state specified by the second channel state information.

(Supplementary Note 9)

The base station according to supplementary note 8, wherein the information related to the update content includes information related to a differential Channel Quality Indicator (CQI) with reference to a CQI specified by the second channel state information.

(Supplementary Note 10)

The base station according to supplementary note 8 or 9, wherein the information related to the update content includes information related to a partial Precoding Matrix Indicator (PMI) with reference to a PMI specified by the second channel state information.

(Supplementary Note 11)

The base station according to any one of supplementary notes 8 to 10, wherein the information related to the update content includes information related to order of Layer 1—Reference Signal Received Power (L1-RSRP) with reference to L1-RSRP specified by the second channel state information.

(Supplementary Note 12)

The base station according to any one of supplementary notes 8 to 11, wherein the information related to the configuration of the first aperiodic trigger state includes information related to the number of bits representing the information related to the update content.

(Supplementary Note 13)

The base station according to any one of supplementary notes 8 to 12, wherein the information related to the configuration of the first aperiodic trigger state includes information related to whether the first channel state information includes the information related to the update content.

(Supplementary Note 14)

A terminal apparatus comprising:

a receiving processing unit configured to receive, from a base station, a Radio Resource Control (RRC) message including information related to a configuration of a first aperiodic trigger state to aperiodically report first channel state information by using a Physical Uplink Control Channel (PUCCH); and a transmitting processing unit configured to transmit, to the base station, the first channel state information using the PUCCH based on the information related to the configuration of the first aperiodic trigger state.

(Supplementary Note 15)

A method comprising:

obtaining information related to a configuration of a first aperiodic trigger state for a terminal apparatus to aperiodically report first channel state information by using a Physical Uplink Control Channel (PUCCH); and transmitting, to the terminal apparatus, a Radio Resource Control (RRC) message including the information related to the configuration of the first aperiodic trigger state.

(Supplementary Note 16)

A method comprising:

receiving, from a base station, a Radio Resource Control (RRC) message including information related to a configuration of a first aperiodic trigger state to aperiodically report first channel state information by using a Physical Uplink Control Channel (PUCCH); and transmitting, to the base station, the first channel state information by using the PUCCH, based on the information related to the configuration of the first aperiodic trigger state.

(Supplementary Note 17)

A program that causes a processor to execute:

obtaining information related to a configuration of a first aperiodic trigger state for a terminal apparatus to aperiodically report first channel state information by using a Physical Uplink Control Channel (PUCCH); and transmitting, to the terminal apparatus, a Radio Resource Control (RRC) message including the information related to the configuration of the first aperiodic trigger state.

(Supplementary Note 18)

A program that causes a processor to execute:

receiving, from a base station, a Radio Resource Control (RRC) message including information related to a configuration of a first aperiodic trigger state to aperiodically report first channel state information by using a Physical Uplink Control Channel (PUCCH); and transmitting, to the base station, the first channel state information by using the PUCCH, based on the information related to the configuration of the first aperiodic trigger state.

(Supplementary Note 19)

A non-transitory computer readable recording medium storing a program that causes a processor to execute:

obtaining information related to a configuration of a first aperiodic trigger state for a terminal apparatus to aperiodically report first channel state information by using a Physical Uplink Control Channel (PUCCH); and transmitting, to the terminal apparatus, a Radio Resource Control (RRC) message including the information related to the configuration of the first aperiodic trigger state.

(Supplementary Note 20)

A non-transitory computer readable recording medium storing a program that causes a processor to execute:

receiving, from a base station, a Radio Resource Control (RRC) message including information related to a configuration of a first aperiodic trigger state to aperiodically report first channel state information by using a Physical Uplink Control Channel (PUCCH); and transmitting, to the base station, the first channel state information by using the PUCCH, based on the information related to the configuration of the first aperiodic trigger state.

This application claims priority based on JP 2018-205676 filed on Oct. 31, 2018, the entire disclosure of which is incorporated herein.

INDUSTRIAL APPLICABILITY

In a mobile communication system, information related to a configuration for reporting aperiodic channel state information using a PUCCH can be appropriately signaled to a terminal apparatus.

REFERENCE SIGNS LIST

1 System
100 Base station
141, 151 Obtaining unit
143, 153 Transmitting processing unit
145 Receiving processing unit
200 Terminal apparatus
231, 241 Receiving processing unit
233, 243 Transmitting processing unit

What is claimed is:

1. A base station comprising:
a memory storing instructions; and
one or more processors configured to execute the instructions to:

obtain information related to a configuration of a first aperiodic trigger state for a terminal apparatus to aperiodically report first channel state information;

obtain information related to a configuration of a plurality of second aperiodic trigger states for the terminal apparatus to aperiodically report second channel state information by using a Physical Uplink Shared Channel (PUSCH);

transmit, to the terminal apparatus, a Radio Resource Control (RRC) message including the information related to the configuration of the first aperiodic trigger state; and transmit, to the terminal apparatus, a Radio Resource Control (RRC) message including the information related to the configuration of the first aperiodic trigger state and the information related to the configuration of the second aperiodic trigger state, the information related to the configuration of the first aperiodic trigger state includes first identification information for identifying the first aperiodic trigger state from a plurality of candidate aperiodic trigger states and the first identification information is information for identifying, from the plurality of second aperiodic trigger states, a second aperiodic trigger state associated with the first aperiodic trigger state.

2. The base station according to claim 1, wherein the information related to the configuration of the second aperiodic trigger state includes second identification information for identifying information related to a configuration of the second channel state information associated with the second aperiodic trigger state, and information related to a configuration of the first channel state information associated with the first aperiodic trigger state is identified based on the second identification information included in the information related to the configuration of the second aperiodic trigger state associated with the first aperiodic trigger state.

3. The base station according to claim 1, wherein the information related to the configuration of the first aperiodic trigger state is information not associated with the information related to the configuration of the second aperiodic trigger state.

4. The base station according to claim 3, wherein the information related to the configuration of the first aperiodic trigger state includes third identification information for identifying information related to a configuration of the first channel state information corresponding to the first aperiodic trigger state.

5. The base station according to claim 1, wherein the first channel state information includes information related to an update content with reference to a channel state specified by the second channel state information.

6. The base station according to claim 5, wherein the information related to the update content includes information related to a differential Channel Quality Indicator (CQI) with reference to a CQI specified by the second channel state information.

7. The base station according to claim 5, wherein the information related to the update content includes information related to a partial Precoding Matrix Indicator (PMI) with reference to a PMI specified by the second channel state information.

8. The base station according to claim 5, wherein the information related to the update content includes information related to order of Layer 1-Reference Signal Received Power (L1-RSRP) with reference to L1-RSRP specified by the second channel state information.

9. The base station according to claim 5, wherein the information related to the configuration of the first aperiodic trigger state includes information related to the number of bits representing the information related to the update content.

10. The base station according to claim 5, wherein the information related to the configuration of the first aperiodic trigger state includes information related to whether the first channel state information includes the information related to the update content.

11. A terminal apparatus comprising:
a memory storing instructions; and
one or more processors configured to execute the instructions to:
   receive, from a base station, a Radio Resource Control (RRC) message including information related to a configuration of a first aperiodic trigger state to aperiodically report first channel state information;
   receive, from the base station, a Radio Resource Control (RRC) message including information related to a configuration of a plurality of second aperiodic trigger states for the terminal apparatus to aperiodically report second channel state information by using a Physical Uplink Shared Channel (PUCCH);
   transmit, to the base station, the first channel state information based on the information related to the configuration of the first aperiodic trigger state;
   transmit, to the base station, the second channel state information using the PUCCH based on the information related to the configuration of the second aperiodic trigger state,
   the information related to the configuration of the first aperiodic trigger state includes first identification information for identifying the first aperiodic trigger state from a plurality of candidate aperiodic trigger states and the first identification information is information for identifying, from the plurality of second aperiodic trigger states, a second aperiodic trigger state associated with the first aperiodic trigger state.

12. A method comprising:
obtaining information related to a configuration of a first aperiodic trigger state for a terminal apparatus to aperiodically report first channel state information;
obtaining information related to a configuration of a plurality of second aperiodic trigger states for the terminal apparatus to aperiodically report second channel state information by using a Physical Uplink Shared Channel (PUSCH);
transmitting, to the terminal apparatus, a Radio Resource Control (RRC) message including the information related to the configuration of the first aperiodic trigger state; and
transmitting, to the terminal apparatus, a Radio Resource Control (RRC) message including the information related to the configuration of the first aperiodic trigger state and the information related to the configuration of the second aperiodic trigger state, the information related to the configuration of the first aperiodic trigger state includes first identification information for identifying the first aperiodic trigger state from a plurality of candidate aperiodic trigger states and the first identification information is information for identifying, from the plurality of second aperiodic trigger states, a second aperiodic trigger state associated with the first aperiodic trigger state.

* * * * *